US010348379B2

(12) United States Patent
Shanmugavadivel et al.

(10) Patent No.: US 10,348,379 B2
(45) Date of Patent: Jul. 9, 2019

(54) SYSTEMS, DEVICES AND METHODS FOR PROVIDING COMMUNICATIONS BETWEEN A BEAMFORMING ACCESS POINT AND A NON-BEAMFORMING DEVICE

(71) Applicant: SYMBOL TECHNOLOGIES, LLC, Lincolnshire, IL (US)

(72) Inventors: Senthilraj Shanmugavadivel, Coimbatore (IN); Jeelan Basha Poola, Karnataka (IN); Varun Tandon, Karnataka (IN)

(73) Assignee: Symbol Technologies, LLC, Holtsville, NY (US)

( * ) Notice: Subject to any disclaimer, the term of this patent is extended or adjusted under 35 U.S.C. 154(b) by 278 days.

(21) Appl. No.: 15/215,955

(22) Filed: Jul. 21, 2016

(65) Prior Publication Data

US 2018/0026692 A1   Jan. 25, 2018

(51) Int. Cl.
| | |
|---|---|
| *H04B 7/06* | (2006.01) |
| *H04W 4/02* | (2018.01) |
| *H04B 7/04* | (2017.01) |
| *H04B 17/318* | (2015.01) |
| *H04B 7/0456* | (2017.01) |
| *H04L 12/801* | (2013.01) |
| *H04W 88/08* | (2009.01) |

(52) U.S. Cl.
CPC ......... *H04B 7/0617* (2013.01); *H04B 7/0456* (2013.01); *H04B 17/318* (2015.01); *H04L 47/29* (2013.01); *H04W 4/023* (2013.01); *H04B 7/0634* (2013.01); *H04W 88/08* (2013.01)

(58) Field of Classification Search
None
See application file for complete search history.

(56) References Cited

U.S. PATENT DOCUMENTS

| 8,804,612 | B1* | 8/2014 | Chen | H04B 7/0456 |
| | | | | 370/252 |
| 2013/0308713 | A1* | 11/2013 | Zhang | H04B 7/0634 |
| | | | | 375/267 |
| 2014/0098701 | A1* | 4/2014 | Sohn, III | H04B 7/065 |
| | | | | 370/252 |
| 2015/0030094 | A1 | 1/2015 | Zhang | |
| 2016/0013855 | A1* | 1/2016 | Campos | H04B 7/12 |
| | | | | 370/343 |

(Continued)

OTHER PUBLICATIONS

International Search Report & Written Opinion for International Patent Application No. PCT/US2017/036340 dated Sep. 19, 2017.

*Primary Examiner* — Kenny S Lin

(57) ABSTRACT

Systems, devices and methods for providing communications between a beamforming access point and a non-beamforming device are provided. The access point determines a beamforming steering matrix from a feedback matrix received from a beamforming device located at a given position, and controls the communication interface to beam form using the beamforming steering matrix to communicate with a non-beamforming device located at the given position. A beamforming device may receive an identifier and characteristics of a non-beamforming device in wireless communication therewith, determine, from the characteristics, a feedback matrix of the non-beamforming device, and transmit the feedback matrix to an access point.

16 Claims, 18 Drawing Sheets

(56) References Cited

U.S. PATENT DOCUMENTS

2016/0043787 A1* 2/2016 Lee ................ H04W 16/28
370/329
2016/0100396 A1* 4/2016 Seok ................ H04L 5/003
370/329

* cited by examiner

# SYSTEMS, DEVICES AND METHODS FOR PROVIDING COMMUNICATIONS BETWEEN A BEAMFORMING ACCESS POINT AND A NON-BEAMFORMING DEVICE

BACKGROUND

Access points, including, 802.11ac access points, can be enabled with beamforming functionality, which assists such access points in communicating with beamforming devices, thereby increasing gain and throughput of data and signals transmitted there between. However, such beamforming access points leverage is not provided with non-beamforming benefits; in particular, such beamforming benefits of 802.11ac access points can be leveraged only by devices that operate according to 802.11ac Wave2 specifications, but not by legacy devices that operate according to one or more of 802.11ac Wave1 specifications, 802.11n specifications and 802.11a specifications, as such legacy devices do not have beamforming functionality.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts described herein, and explain various principles and advantages of those implementations.

Figure 1:
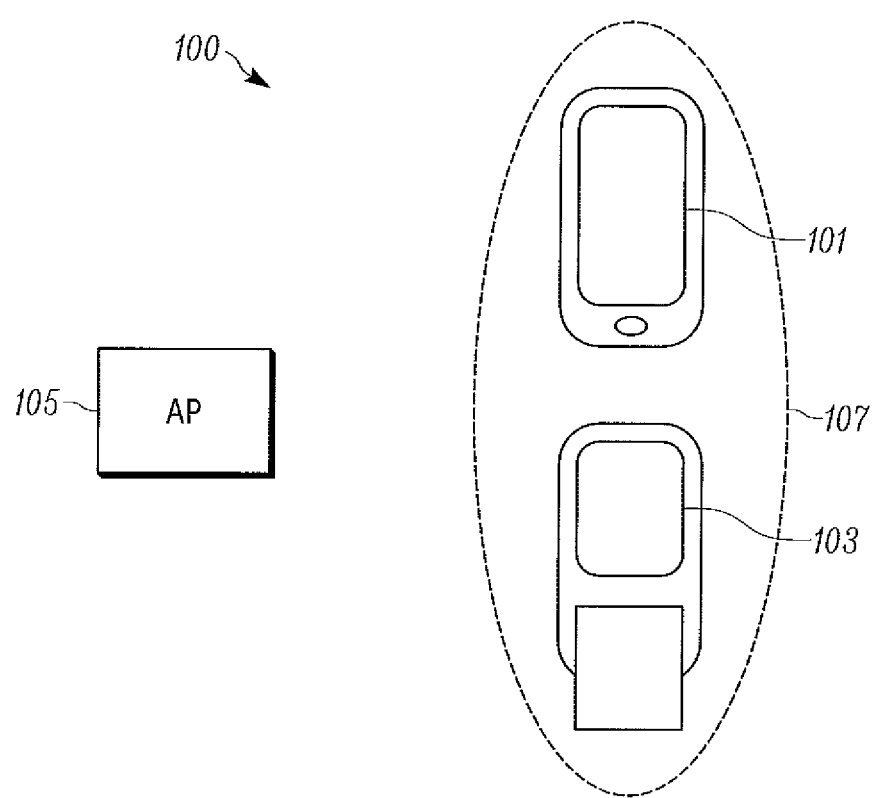
FIG. 1 depicts a schematic diagram of a system for providing communications between a beamforming access point and a non-beamforming device, according to non-limiting implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present specification.

The apparatus and method components have been represented where appropriate by conventional symbols in the drawings, showing only those specific details that are pertinent to understanding the implementations of the present specification so as not to obscure the disclosure with details that will be readily apparent to those of ordinary skill in the art having the benefit of the description herein.

DETAILED DESCRIPTION

An aspect of the specification provides an access point comprising: a processor, and a communication interface configured for beamforming, the processor configured to: determine a beamforming steering matrix from a feedback matrix received from a beamforming device located at a given position; and, control the communication interface to beam form using the beamforming steering matrix to communicate with a non-beamforming device located at the given position.

The processor can be further configured to: transmit, to the beamforming device, characteristics of the non-beamforming device, the feedback matrix received from the beamforming device based on the characteristics of the non-beamforming device.

The access point can further comprise a memory storing characteristics of the non-beamforming device in association with an identifier of the non-beamforming device, wherein the processor can be further configured to: receive, from the beamforming device, the identifier of the non-beamforming device, the non-beamforming device being proximal to, and in communication with, the beamforming device at the given position; and, transmit, to the beamforming device, the characteristics of the non-beamforming device, the feedback matrix received from the beamforming device based on the characteristics of the non-beamforming device.

The access point can further comprise a memory, wherein the processor can be further configured to: determine an identifier and characteristics of the non-beamforming device by initially communicating with the non-beamforming device using the communication interface in a non-beamforming mode; store the identifier and the characteristics of the non-beamforming device in the memory; receive, from the beamforming device, the identifier of the non-beamforming device; and, transmit, to the beamforming device, the characteristics of the non-beamforming device retrieved from the memory using the identifier received from the beamforming device, the feedback matrix received from the beamforming device based on the characteristics of the non-beamforming device.

The access point can further comprise a memory storing characteristics of the non-beamforming device in association with an identifier of the non-beamforming device, wherein the processor can be further configured to: receive, from the beamforming device, the identifier of the non-beamforming device in association with a respective signal strength of the non-beamforming device at the beamforming device, the non-beamforming device being in communication with the beamforming device at the given position; when the signal strength is above a threshold signal strength, transmit, to the beamforming device, the characteristics of the non-beamforming device, the feedback matrix received from the beamforming device based on the characteristics of the non-beamforming device; and when the signal strength is below the threshold signal strength, communicate with the non-beamforming device using the communication interface in a non-beamforming mode.

The processor can be further configured to: receive, from one or more location sensors, using the communication interface, data indicative of positions of each of the beamforming device and the non-beamforming device; and, control the communication interface to beam form using the beamforming steering matrix to communicate with the non-beamforming device only when the beamforming device and the non-beamforming device are with a given threshold distance.

The access point can further comprise a memory, wherein the processor can be further configured to: store the beamforming steering matrix in the memory in association with the given position; receive, from one or more location sensors, using the communication interface, an indication that the non-beamforming device is located at the given position; and, in response, control the communication interface to beam form using the beamforming steering matrix to communicate with the non-beamforming device located at the given position only when the non-beamforming device is at the given position.

Another aspect of the specification provides a method comprising: at an access point including a processor, and a communication interface configured for beamforming, determining, at the processor, a beamforming steering matrix from a feedback matrix received from a beamforming device located at a given position; and, controlling, at the processor, the communication interface to beam form using the beamforming steering matrix to communicate with a non-beamforming device located at the given position.

The method can further comprise: transmitting, to the beamforming device, characteristics of the non-beamforming device, the feedback matrix received from the beamforming device based on the characteristics of the non-beamforming device.

The access point can further comprise a memory storing characteristics of the non-beamforming device in association with an identifier of the non-beamforming device, and the method can further comprise: receiving, from the beamforming device, the identifier of the non-beamforming device, the non-beamforming device being proximal to, and in communication with, the beamforming device at the given position; and, transmitting, to the beamforming device, the characteristics of the non-beamforming device, the feedback matrix received from the beamforming device based on the characteristics of the non-beamforming device.

The access point can further comprises a memory, and the method can further comprise: determining an identifier and characteristics of the non-beamforming device by initially communicating with the non-beamforming device using the communication interface in a non-beamforming mode; storing the identifier and the characteristics of the non-beamforming device in the memory; receiving, from the beamforming device, the identifier of the non-beamforming device; and, transmitting, to the beamforming device, the characteristics of the non-beamforming device retrieved from the memory using the identifier received from the beamforming device, the feedback matrix received from the beamforming device based on the characteristics of the non-beamforming device.

The access point can further comprise a memory storing characteristics of the non-beamforming device in association with an identifier of the non-beamforming device, and the can further comprise: receiving, from the beamforming device, the identifier of the non-beamforming device in association with a respective signal strength of the non-beamforming device at the beamforming device, the non-beamforming device being in communication with the beamforming device at the given position; when the signal strength is above a threshold signal strength, transmitting, to the beamforming device, the characteristics of the non-beamforming device, the feedback matrix received from the beamforming device based on the characteristics of the non-beamforming device; and when the signal strength is below the threshold signal strength, communicating with the non-beamforming device using the communication interface in a non-beamforming mode.

The method can further comprise: receiving, from one or more location sensors, using the communication interface, data indicative of positions of each of the beamforming device and the non-beamforming device; and, controlling the communication interface to beam form using the beamforming steering matrix to communicate with the non-beamforming device only when the beamforming device and the non-beamforming device are with a given threshold distance.

The access point can further comprise a memory, and the method can further comprise: storing the beamforming steering matrix in the memory in association with the given position; receiving, from one or more location sensors, using the communication interface, an indication that the non-beamforming device is located at the given position; and, in response, controlling the communication interface to beam form using the beamforming steering matrix to communicate with the non-beamforming device located at the given position only when the non-beamforming device is at the given position.

Yet a further aspect of the specification provides a computer-readable medium storing a computer program, wherein execution of the computer program is for: at an access point including a processor, and a communication interface configured for beamforming, determining, at the processor, a beamforming steering matrix from a feedback matrix received from a beamforming device located at a given position; and, controlling, at the processor, the communication interface to beam form using the beamforming steering matrix to communicate with a non-beamforming device located at the given position. The computer-readable medium can comprise a non-transitory computer-readable medium.

Yet a further aspect of the specification provides a beamforming device comprising: a processor, and a communication interface configured for beamforming, the processor configured to: receive, using the communication interface, an identifier of a non-beamforming device in wireless communication therewith, and characteristics of the non-beamforming device; determine, from the characteristics of the non-beamforming device, a feedback matrix of the non-beamforming device; and, transmit the feedback matrix to an access point.

The processor can be further configured to receive the characteristics of the non-beamforming device by: receiving, from the non-beamforming device, the identifier of the non-beamforming device; transmitting, using the communication interface, the identifier to the access point; and, receiving, from the access point, the characteristics of the non-beamforming device.

The processor can be further configured to: determine a signal strength of the non-beamforming device at the beamforming device; and transmit the identifier to the access point only when the signal strength is above a threshold signal strength.

The processor can be further configured to: determine a signal strength of the non-beamforming device at the beamforming device; and transmit, to the access point, the identifier and the signal strength in association with each other.

Another aspect of the specification provides a method comprising: at a beamforming device including a processor, and a communication interface configured for beamforming, receiving, using the communication interface, an identifier of a non-beamforming device in wireless communication therewith, and characteristics of the non-beamforming device; determining, from the characteristics of the non-beamforming device, a feedback matrix of the non-beamforming device; and, transmitting the feedback matrix to an access point.

The method can further comprise receiving the characteristics of the non-beamforming device by: receiving, from the non-beamforming device, the identifier of the non-beamforming device; transmitting, using the communication interface, the identifier to the access point; and, receiving, from the access point, the characteristics of the non-beamforming device.

The method can further comprise: determining a signal strength of the non-beamforming device at the beamforming device; and transmitting the identifier to the access point only when the signal strength is above a threshold signal strength.

The method can further comprise: determining a signal strength of the non-beamforming device at the beamforming device; and transmitting, to the access point, the identifier and the signal strength in association with each other.

Yet a further aspect of the specification provides a computer-readable medium storing a computer program, wherein execution of the computer program is for: at a beamforming device including a processor, and a communication interface configured for beamforming, receiving, using the communication interface, an identifier of a non-beamforming device in wireless communication therewith, and characteristics of the non-beamforming device; determining, from the characteristics of the non-beamforming device, a feedback matrix of the non-beamforming device; and, transmitting the feedback matrix to an access point. The computer-readable medium can comprise a non-transitory computer-readable medium.

Attention is directed to FIG. 1 which depicts a schematic diagram of a system 100 for providing communications between a beamforming access point and a non-beamforming device. System 100 comprises a beamforming device 101 (interchangeably referred hereafter as device 101), a non-beamforming device 103 (interchangeably referred hereafter as device 103), and an access point 105 (interchangeably referred hereafter as AP 105). Each of devices 101, 103 are generally located at a given position 107; in other words, devices 101, 103 are one or more of proximal to each other and/or adjacent to each other at given position 107.

Each of devices 101, 103 can each generally comprise a mobile device which can include, but is not limited to, any suitable combination of electronic devices, communications devices, computing devices, personal computers, laptop computers, portable electronic devices, mobile computing devices, portable computing devices, tablet computing devices, laptop computing devices, telephones, PDAs (personal digital assistants), cellphones, smartphones, e-readers, internet-enabled appliances, mobile camera devices and the like. Other suitable devices are within the scope of present implementations. For example, each device 101, 103 need not comprise a mobile communication device, but rather can comprise a device with specialized functions, for example a device having warehouse inventory tracking and/or other data acquisition functionality, such as a mobile scanner having one or more of radio frequency identification (RFID) reader, Near Field Communication (NFC) reader, imager, and/or laser-based scanner data acquisition components. In yet further implementations, each device 101, 103 can be mountable in a vehicle.

However, as depicted device 101 comprises a mobile communication device, configured for data and/or telephony functionality, and optionally for warehousing functionality, and device 103 comprises a mobile printing device, configured for printing functionality, data and/or telephony functionality, and optionally for warehousing functionality. However, other devices are within the scope of present implementations.

In particular, device 101 is configured for beamforming communication with, for example, access point 105 (and/or other beamforming devices), while device 103 is not configured for beamforming communication. In particular non-limiting implementations, device 101 can operate according to the 802.11ac Wave2 specification, while device 103 can operate according to one or more of the 802.11ac Wave1 specification, the 802.11n specification and the 802.11a specification. However, each of devices 101, 103 can operate according to other specifications as long as device 101 is configured for beamforming, while device 103 is not configured for beamforming, and each can communicate with AP 105.

AP 105 is generally configured to provide wireless access to a network (and the like) to communication devices, mobile devices, and the like, including, but not limited to, each of devices 101, 103. Furthermore, AP 105 is generally configured for beamforming. Hence, for example, AP 105 can comprise one or more of a WiFi access point, a WiMax access point, and the like, that operates according to the 802.11ac Wave2 specification. As such, while not depicted, AP 105 is further in communication with a network, and is configured to convey data between the network and devices 101, 103.

As will be described below, each of device 101 and AP 105 can operate in several communication modes, including, but not limited to, a beamforming communication mode and non-beamforming communication mode. For example, each of device 101 and AP 105 can operate in a beamforming mode when communicating with other beamforming devices, and each of device 101 and AP 105 can operate in a non-beamforming mode when communicating with non-beamforming devices.

However, at least AP 105 is further adapted to communicate with a non-beamforming device in a beamforming mode when, for example, AP 105 can determine a beamforming steering matrix from a feedback matrix received from a beamforming device located at a given position, the beamforming steering matrix used to communicate with the non-beamforming device located at the given position, as will be described in more detail below.

In general, two beamforming devices exchange certain data in order to more efficiently perform beamforming. For example, a transmitting beamforming device can receive, from a receiving beamforming device, a feedback matrix, which can be determined based on an initial received signal from the transmitting beamforming device and parameters of the receiving beamforming device. Such parameters can include, but are not limited to, a bandwidth capability of the receiving beamforming device; for example, faster communication devices can have a different feedback matrix than slower devices. The transmitting beamforming device receives the feedback matrix and determines, therefrom, a beamforming steering matrix, which can interchangeably referred to as a transition matrix, the beamforming steering matrix used to control a beamforming antenna in beamforming communications with the receiving beamforming device.

As non-beamforming devices are not configured for either beamforming or determining a feedback matrix, beamforming devices generally communicate with non-beamforming devices in a non-beamforming mode in which signals are transmitted generally uniformly from the beamforming device and/or according to a radiation pattern, and the like, of all elements of the beamforming antenna and/or using a second non-beamforming antenna at the beamforming antenna.

Each of devices 101, 103 and access point 105 will now be described in more detail.

Figure 2:
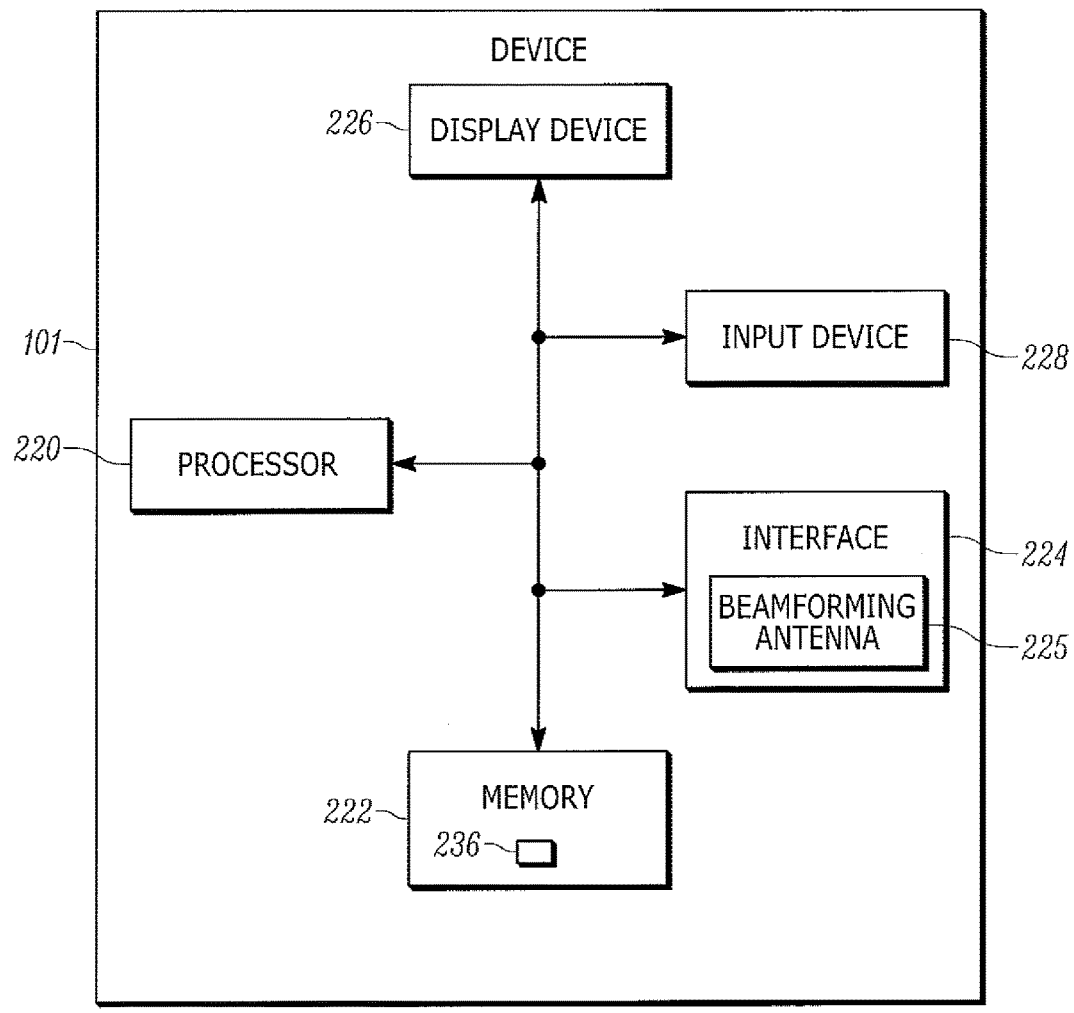
FIG. 2 depicts a schematic diagram of a beamforming device of the system of FIG. 1, according to non-limiting implementations.

Attention is next directed to FIG. 2 which depicts a schematic diagram of device 101. Device 101 comprises: a processor 220; a memory 222; and a communication interface 224 (interchangeably referred to hereafter as interface 224) which in turn comprises a beamforming antenna 225. As depicted, device 101 further comprises a display device 226 and at least one input device 228, however such components can be optional.

Processor 220 can comprise a processor and/or a plurality of processors, including but not limited to one or more central processors (CPUs) and/or one or more processing units; either way, processor 220 comprises a hardware element and/or a hardware processor. Indeed, in some implementations, processor 220 can comprise an ASIC (application-specific integrated circuit) and/or an FPGA (field-programmable gate array) specifically configured to implement the functionality of device 101. In other words, processor 220 can comprise a processor configured to control interface 224, and in particular beamforming antenna 225, in communications with AP 105; hence, device 101 is preferably not a generic computing device, but a device specifically configured to implement specific beamforming functionality. For example, device 101 and/or processor 220 can specifically comprise a computer executable engine configured to implement specific beamforming functionality to assist AP 105 in beamforming communications with non-beamforming device 103.

Memory 222 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 222 and used by processor 220 which makes appropriate utilization of volatile storage during the execution of such programming instructions. Those skilled in the art recognize that memory 222 is an example of computer readable media that can store programming instructions executable on processor 220. Furthermore, memory 222 is also an example of a memory unit and/or memory module and/or a non-volatile memory.

In particular, memory 222 can store an application 236 that, when executed by processor 220, enables processor 220 to implement beamforming functionality, to assist AP 105 in beamforming communications with non-beamforming device 103. In particular, in some implementations, when processor 220 processes application 236, processor 220 is enabled to: receive, using communication interface 224, characteristics of non-beamforming device 103; determine, from the characteristics of non-beamforming device 103, a feedback matrix of non-beamforming device 103; and, transmit the feedback matrix to the access point 105.

As depicted, processor 220 also connects to interface 224, which can be implemented as one or more radios and/or connectors and/or network adaptors, configured to communicate wired and/or wirelessly with corresponding interfaces at device 103 and access point 105 and optionally one or more communication networks (not depicted). Specifically, interface 224 comprises a beamforming antenna 225 that can comprise a plurality of antenna elements (not depicted) that can be controlled by processor 220 for beamforming communication with corresponding interfaces at other beamforming devices, including, but not limited to, AP 105. However, beamforming antenna 225 can also be used in non-beamforming communications; alternatively, and while not depicted, interface 224 can further comprise a non-beamforming antenna. Either way, interface 224 is further enabled for non-beamforming communication with corresponding interfaces at non-beamforming devices, including, but not limited to, device 103.

It will be appreciated that interface 224 is further configured to correspond with network architecture that is used to implement one or more communication links between other devices and/or network, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, WLAN (wireless local area network) links, WiFi links, WiMax links, packet based links, the Internet, analog networks, the PSTN (public switched telephone network), access points, and the like, and/or a combination.

Processor 220 can be further configured to communicate with optional display device 226, which comprises any suitable one of, or combination of, flat panel displays (e.g. LCD (liquid crystal display), plasma displays, OLED (organic light emitting diode) displays, capacitive or resistive touchscreens, CRTs (cathode ray tubes) and the like). Processor 220 be further configured to communicate with input device 228, which is configured to receive input data; as such, input device 228 can comprise any suitable combination of input devices, including but not limited to a keyboard, a keypad, a pointing device, a mouse, a track wheel, a trackball, a touchpad, a touch screen (e.g. integrated with display device 226), and the like. Other suitable input devices are within the scope of present implementations.

While not depicted, device 101 further comprises a power supply, including, but not limited to, a connection to a mains power supply and/or a power adaptor (e.g. and AC-to-DC (alternating current to direct current) adaptor), and alternatively a battery, a power pack and the like. In general the power supply powers components of device 101.

Hence, it should be understood that in general a wide variety of configurations for device 101 are contemplated and device 101 can include other components, including, but not limited to, a speaker, a microphone and the like.

Figure 3:
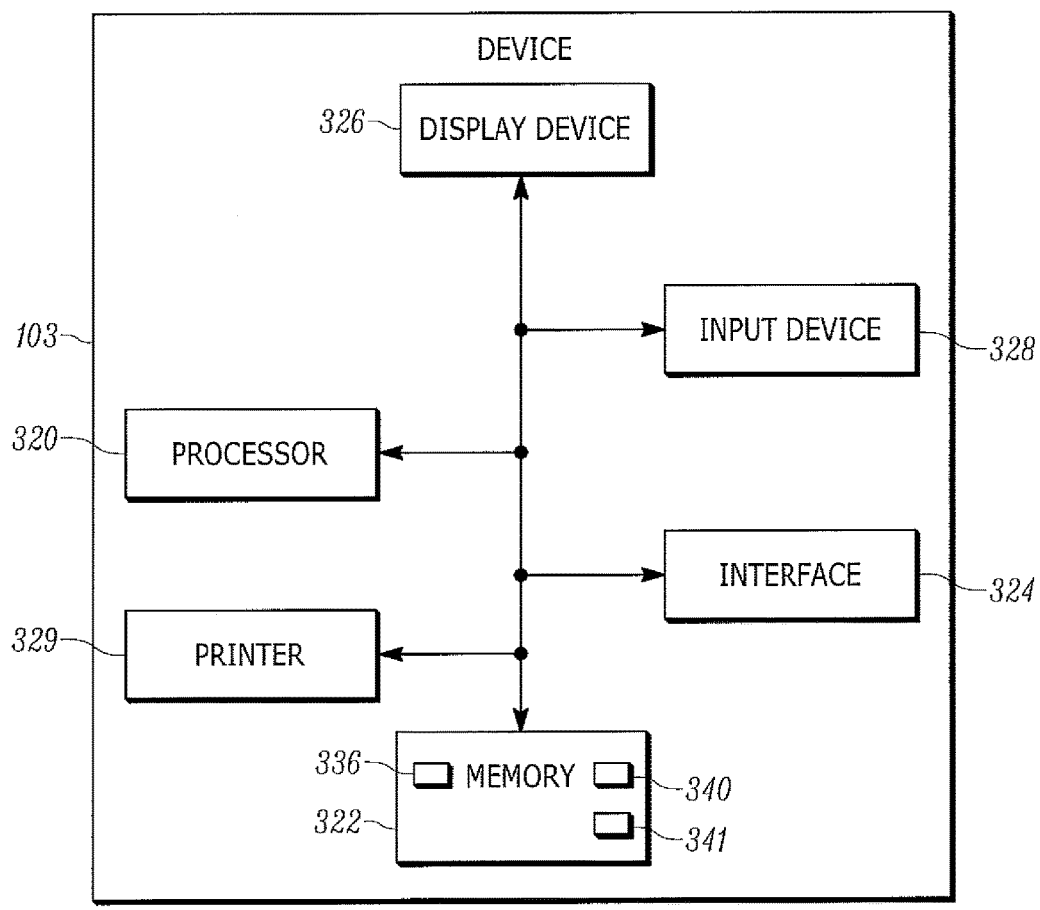
FIG. 3 depicts a schematic diagram of a non-beamforming device of the system of FIG. 1, according to non-limiting implementations.

Attention is next directed to FIG. 3 which depicts a schematic diagram of device 103. Device 103 comprises: a processor 320; a memory 322; and a communication interface 324 (interchangeably referred to hereafter as interface 324). As depicted, device 103 further comprises a display device 326, at least one input device 328, and a printer 329, however such components can be optional. Each of processor 320, memory 322, interface 324, display device 326, input device 328, can be substantially similar, respectively, to processor 220, memory 222, interface 224, display device 226, input device 228, of device 101, however interface 324 does not comprise a beamforming antenna and is configured specifically for non-beamforming communication with other devices.

Processor 320 can comprise a processor and/or a plurality of processors, including but not limited to one or more central processors (CPUs) and/or one or more processing units; either way, processor 320 comprises a hardware element and/or a hardware processor. Indeed, in some implementations, processor 320 can comprise an ASIC (application-specific integrated circuit) and/or an FPGA (field-programmable gate array) specifically configured to implement the functionality of device 103. In other words, processor 320 can comprise a processor configured to communicate with one or more of device 101 and AP 105 to provide characteristics thereof, with an identifier of device 103, to assist device 101 in determining a feedback matrix associated with device 103. Hence, device 103 is preferably not a generic computing device, but a device specifically configured to assist AP 105 with providing beamforming communications to device 103. For example, device 103 and/or processor 320 can specifically comprise a computer executable engine configured to implement specific beamforming functionality to assist AP 105 in beamforming communications with non-beamforming device 103.

Memory 322 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 103 as described herein are typically maintained, persistently, in memory 322 and used by processor 320 which makes appropriate utilization of volatile storage during the execution of such programming instructions. Those skilled in the art recognize that memory 322 is an example of computer readable media that can store programming instructions executable on processor 320. Furthermore, memory 322 is also an example of a memory unit and/or memory module and/or a non-volatile memory.

In particular, memory 322 can store an application 336 that, when executed by processor 320, enables processor 320 to assist AP 105 in beamforming communications with non-beamforming device 103. For example, memory 322 can further store an identifier 340 of device 103, and characteristics 341 of device 103. Identifier 340 can include, but is not limited to, a MAC (Media Access Control) address, a text identifier and the like, of device 103. Characteristics 341 can include, but are not limited to, a bandwidth capability of device 103 (e.g. provided in megabytes per second (MPBS)); in general, characteristics comprise communication characteristics used to determine a feedback matrix for beamforming communications, even though device 103 comprises a non-beamforming device. Characteristics 341 can interchangeably referred to as communication characteristics 341 and/or beamforming feedback characteristics 341, and the like. Identifier 340 and characteristics 341 can be provisioned at memory 322 at a factory and/or in a provisioning process.

In particular, in some implementations, when processor 320 processes application 336, processor 320 is enabled to: transmit, to one or more of device 101 and AP 105, identifier 340 and characteristics 341; and, thereafter, receive beamformed communications, at interface 324, from at least AP 105. Identifier 340 and characteristics 341 can be transmitted upon request from one or more of device 101 and AP 105, and/or alternatively transmitted in a beacon, and the like, from device 103.

As depicted, processor 320 also connects to interface 324, which can be implemented as one or more radios and/or connectors and/or network adaptors, configured to communicate wired and/or wirelessly with corresponding interfaces at device 101 and access point 105 and optionally one or more communication networks (not depicted). However, unlike interface 224 at device 101, interface 324 does not include a beamforming antenna. It will be appreciated that interface 324 is further configured to correspond with network architecture that is used to implement one or more communication links between other devices and/or network, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, WLAN (wireless local area network) links, WiFi links, WiMax links, packet based links, the Internet, analog networks, the PSTN (public switched telephone network), access points, and the like, and/or a combination.

Processor 320 can be further configured to communicate with optional display device 326, which comprises any suitable one of, or combination of, flat panel displays (e.g. LCD (liquid crystal display), plasma displays, OLED (organic light emitting diode) displays, capacitive or resistive touchscreens, CRTs (cathode ray tubes) and the like). Processor 320 can be further configured to communicate with input device 328, which is configured to receive input data; as such, input device 328 can comprise any suitable combination of input devices, including but not limited to a keyboard, a keypad, a pointing device, a mouse, a track wheel, a trackball, a touchpad, a touch screen (e.g. integrated with display device 326), and the like. Other suitable input devices are within the scope of present implementations. Processor 320 can be further configured to communicate with optional printer 329 which is configured to print data on paper, and the like, to perform, for example, warehousing functionality.

While not depicted, device 103 further comprises a power supply, including, but not limited to, a connection to a mains power supply and/or a power adaptor (e.g. and AC-to-DC (alternating current to direct current) adaptor), and alternatively a battery, a power pack and the like. In general the power supply powers components of device 103.

Hence, it should be understood that in general a wide variety of configurations for device 103 are contemplated and device 103 can include other components, including, but not limited to, a speaker, a microphone and the like.

Figure 4:
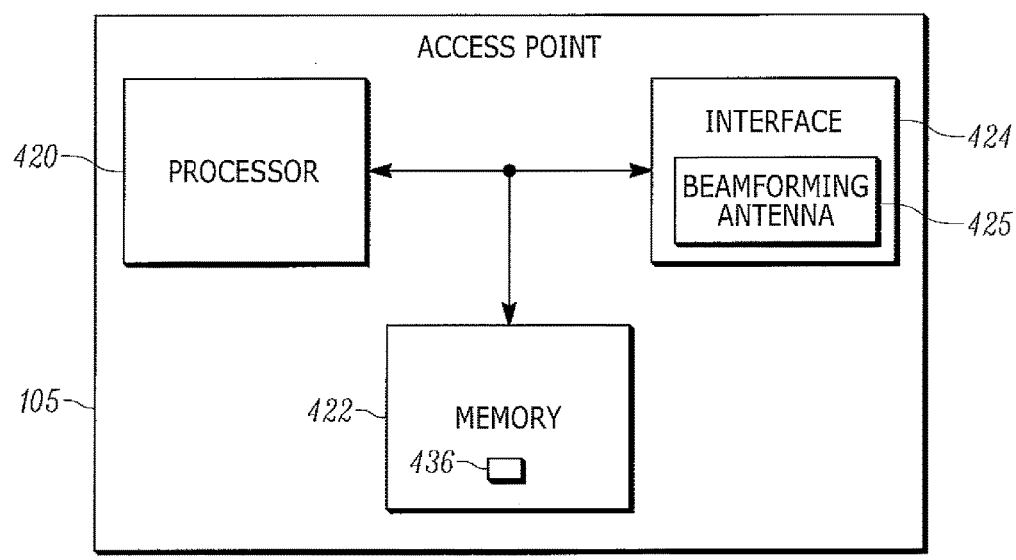
FIG. 4 depicts a schematic diagram of a beamforming access point of the system of FIG. 1, according to non-limiting implementations.

Attention is next directed to FIG. 4 which depicts a schematic diagram of AP 105. AP 105 comprises: a processor 420; a memory 422; and a communication interface 424 (interchangeably referred to hereafter as interface 424) which in turn comprises a beamforming antenna 425. While not depicted, AP 105 can further comprise a display device and at least one input device, however such components are optional. Each of processor 420, memory 422, interface 424, and beamforming antenna 425, can be substantially similar, respectively, to processor 220, memory 222, interface 224, beamforming antenna 225, of device 101, adapted, however, for access point functionality.

Processor 420 can comprise a processor and/or a plurality of processors, including but not limited to one or more central processors (CPUs) and/or one or more processing units; either way, processor 420 comprises a hardware element and/or a hardware processor. Indeed, in some implementations, processor 420 can comprise an ASIC (application-specific integrated circuit) and/or an FPGA (field-programmable gate array) specifically configured to implement the functionality of AP 105. In other words, processor 420 can comprise a processor configured to control interface 424, and in particular beamforming antenna 425, in communications with devices 101, 103; hence, AP 105 is preferably not a generic computing device, but a device specifically configured to implement beamforming functionality. For example, AP 105 and/or processor 420 can specifically comprise a computer executable engine configured to implement specific beamforming functionality in beamforming communications with non-beamforming device 103.

Memory 422 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of AP 105 as described herein are typically maintained, persistently, in memory 422 and used by processor 420 which makes appropriate utilization of volatile storage during the execution of such programming instructions. Those skilled in the art recognize that memory 422 is an example of computer readable media that can store programming instructions executable on processor 420. Furthermore, memory 422 is also an example of a memory unit and/or memory module and/or a non-volatile memory.

In particular, memory 422 can store an application 436 that, when executed by processor 420, enables processor 420 to: determine a beamforming steering matrix from a feedback matrix received from beamforming device 101 located at a given position; and, control communication interface 424 to beam form using the beamforming steering matrix to communicate with non-beamforming device 103 located at the given position.

As depicted, processor 420 also connects to interface 424, which can be implemented as one or more radios and/or connectors and/or network adaptors, configured to communicate wired and/or wirelessly with corresponding interfaces at device 103 and access point 105 and optionally one or more communication networks (not depicted). Specifically, interface 424 comprises a beamforming antenna 425 that can comprise a plurality of antenna elements (not depicted) that can be controlled by processor 420 for beamforming communication with corresponding interfaces at other beamforming devices, including, but not limited to, device 101, and/or for beamforming communication with non-beamforming devices, including, but not limited to, device 103, upon processing of application 436. However, beamforming antenna 425 can also be used in non-beamforming communications; alternatively, and while not depicted, interface 424 can further comprise a non-beamforming antenna. Either way, interface 424 is further enabled for non-beamforming communication with corresponding interfaces at non-beamforming devices, including, but not limited to, device 103.

It will be appreciated that interface 424 is further configured to correspond with network architecture that is used to implement one or more communication links between other devices and/or network, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, WLAN (wireless local area network) links, WiFi links, WiMax links, packet based links, the Internet, analog networks, the PSTN (public switched telephone network), access points, and the like, and/or a combination.

While not depicted, AP 105 further comprises a power supply, including, but not limited to, a connection to a mains power supply and/or a power adaptor (e.g. and AC-to-DC (alternating current to direct current) adaptor), and alternatively a battery, a power pack and the like. In general the power supply powers components of AP 105.

Hence, it should be understood that in general a wide variety of configurations for AP 105 are contemplated and AP 105 can include other components, including, but not limited to, a display device, at least one input device, a speaker, a microphone and the like.

Figure 5:
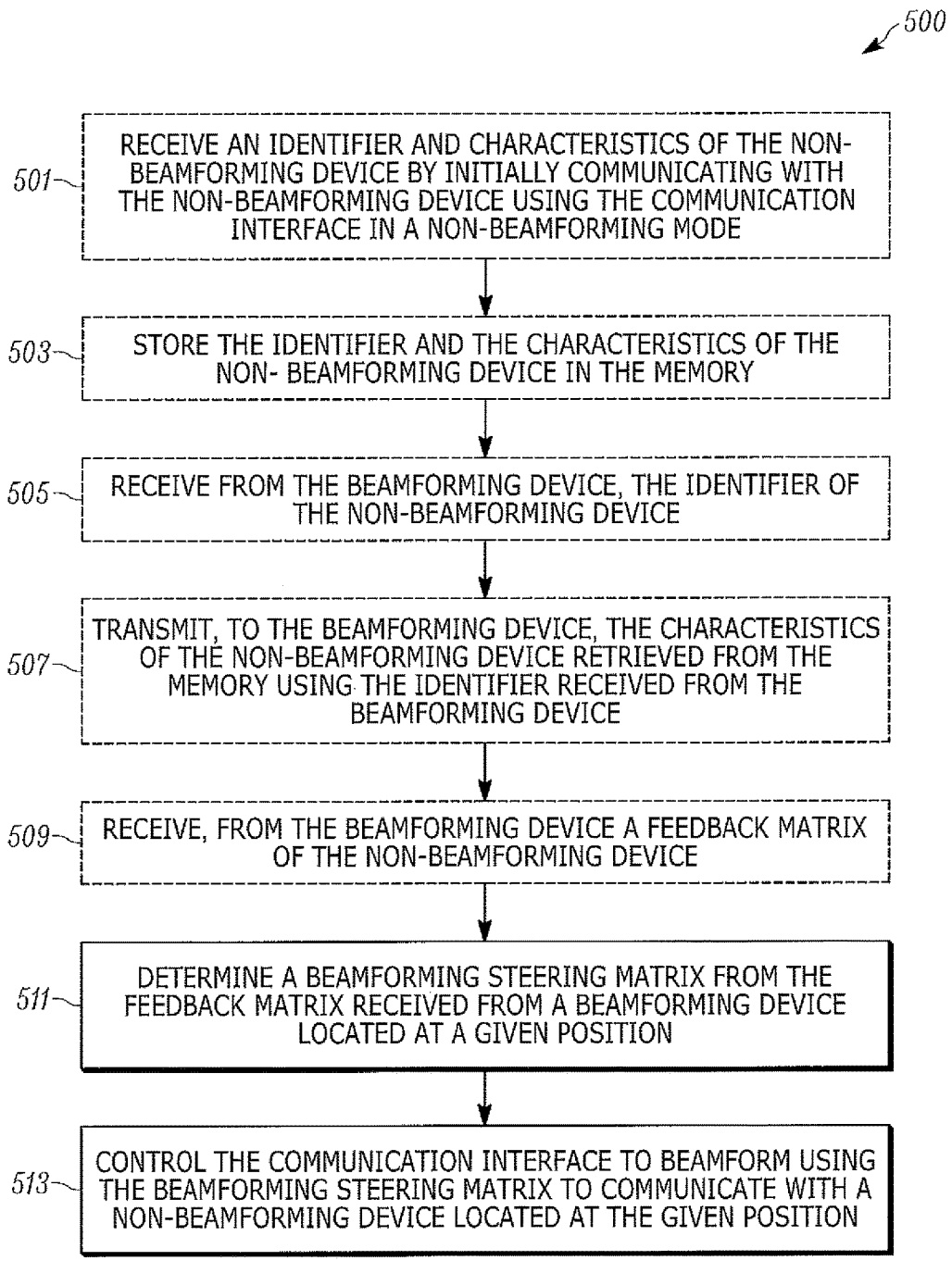
FIG. 5 depicts a block diagram of a flowchart of a method for communications between a beamforming access point and a non-beamforming device, according to non-limiting implementations.

Attention is now directed to FIG. 5 which depicts a block diagram of a flowchart of a method 500 for providing communications between a beamforming access point and a non-beamforming device, according to non-limiting implementations. In order to assist in the explanation of method 500, it will be assumed that method 500 is performed using AP 105, and specifically by processor 420 at AP 105, when processor 420 processes instructions stored at memory 422, for example application 436. Indeed, method 500 is one way in which AP 105 can be configured. Furthermore, the following discussion of method 500 will lead to a further understanding of AP 105, and its various components, as well as system 100. However, it is to be understood that AP 105 and/or method 500 and/or system 100 can be varied, and need not work exactly as discussed herein in conjunction with each other, and that such variations are within the scope of present implementations.

Regardless, it is to be emphasized, that method 500 need not be performed in the exact sequence as shown, unless otherwise indicated; and likewise various blocks may be performed in parallel rather than in sequence; hence the elements of method 500 are referred to herein as "blocks" rather than "steps". It is also to be understood, however, that method 500 can be implemented on variations of AP 105 as well.

It is assumed in method 500 that devices 101, 103 are located at given position 107 and hence are proximal and/or adjacent to one another, as depicted in FIG. 1. Further, as will be further described below, certain aspects of method 500 can depend on device 101 detecting that device 103 is proximal thereto.

It is further appreciated that blocks 501, 503, 505, 507 and 509 of method 500 can be optional, depending on a configuration of a system for providing communications between a beamforming access point and a non-beamforming device; alternative configurations of systems for providing communications between a beamforming access point and a non-beamforming device will be described in further detail below. Optionality of blocks 501, 503, 505, 507 and 509 of method 500 are indicated by blocks 501, 503, 505, 507 and 509 of method 500 being depicted in broken lines.

At block 501, processor 420 can receive identifier 340 and characteristics 341 of non-beamforming device 103 by initially communicating with non-beamforming device 103 using communication interface 424 in a non-beamforming mode.

At block 503, processor 420 can store identifier 340 and characteristics 341 of non-beamforming device 103 in memory 422.

At block 505, processor 420 can receive from beamforming device 101, identifier 340 of non-beamforming device 103.

At block 507, processor 420 can transmit, to beamforming device 101, characteristics 341 of non-beamforming device 103 retrieved from memory 422 using identifier 340 received from beamforming device 101

At block 509, processor 420 can receive a feedback matrix received from beamforming device 101 based on characteristics 341 of non-beamforming device 103. In some implementations, beamforming device 101 transmits the feedback matrix only when beamforming device 101 determines that non-beamforming device 103 is proximal thereto.

At block 511, processor 420 determines a beamforming steering matrix from a feedback matrix received from beamforming device 101 located at a given position.

At block 513, processor 420 controls communication interface 424 to beam form using the beamforming steering matrix to communicate with non-beamforming device 103 located at the given position.

Figure 6:
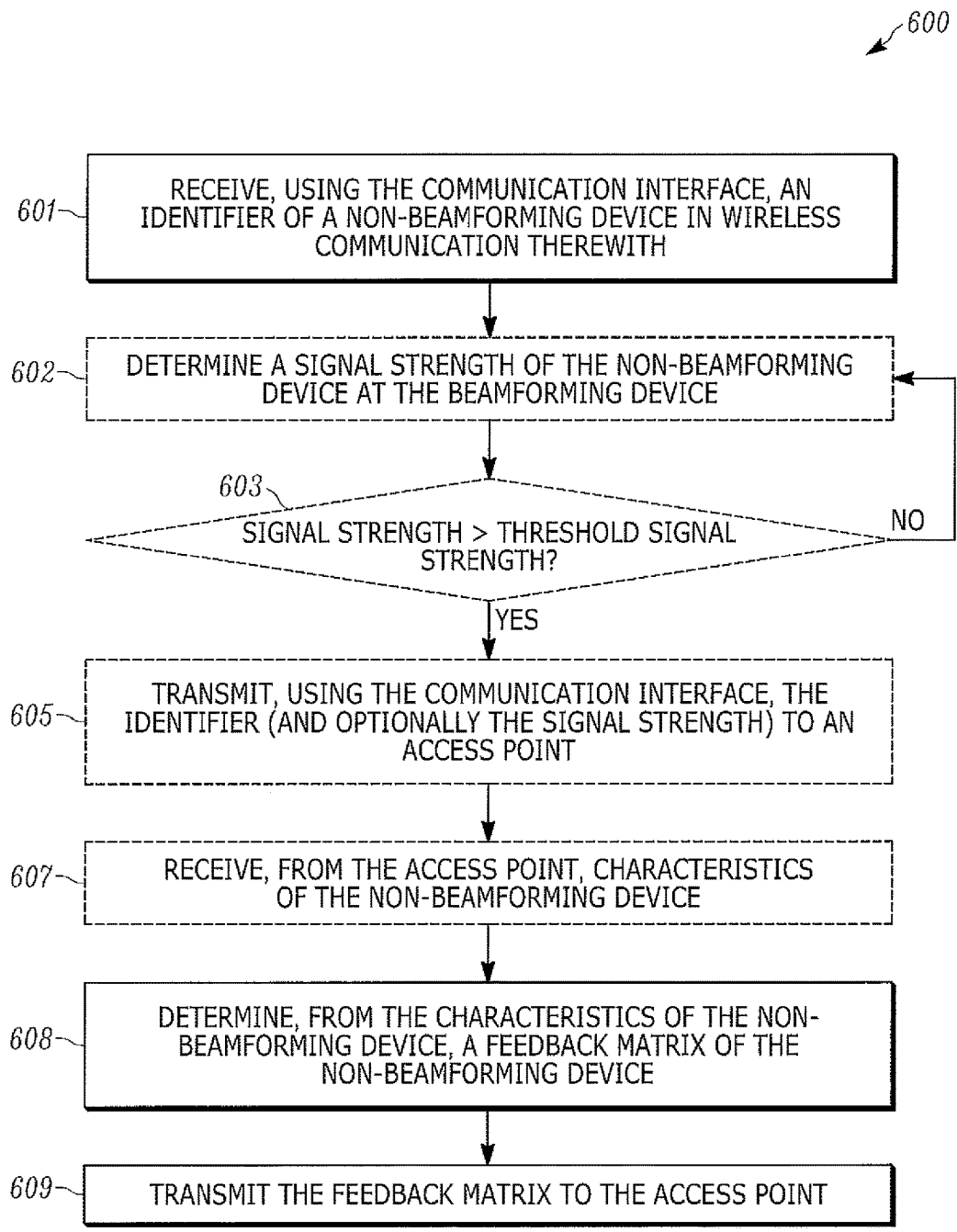
FIG. 6 depicts a block diagram of a flowchart of a method for communications between a beamforming access point and a non-beamforming device, which can be implemented concurrently with the method of FIG. 5, according to non-limiting implementations.

Attention is now directed to FIG. 6 which depicts a block diagram of a flowchart of a method 600 for providing communications between a beamforming access point and a non-beamforming device, which can be implemented concurrently with method 500, according to non-limiting implementations. In order to assist in the explanation of method 600, it will be assumed that method 600 is performed using device 101, and specifically by processor 220 at device 101, when processor 220 processes instructions stored at memory 222, for example application 236. Indeed, method 600 is one way in which device 101 can be configured. Furthermore, the following discussion of method 600 will lead to a further understanding of device 101, and its various components, as well as system 100. However, it is to be understood that device 101 and/or method 600 and/or system 100 can be varied, and need not work exactly as discussed herein in conjunction with each other, and that such variations are within the scope of present implementations.

Regardless, it is to be emphasized, that method 600 need not be performed in the exact sequence as shown, unless otherwise indicated; and likewise various blocks may be performed in parallel rather than in sequence; hence the elements of method 600 are referred to herein as "blocks" rather than "steps". It is also to be understood, however, that method 600 can be implemented on variations of device 101 as well.

It is further appreciated that blocks 602, 603, 605 and 607 of method 600 can be optional depending on a configuration of each of device 101, device 103, and AP 105 as will be described in further detail below. Optionality of blocks 602, 603, 605 and 607 of method 600 are indicated by bl602, 603, 605 and 607 of method 600 being depicted in broken lines.

At block 601, processor 220 receives, using communication interface 224, identifier 340 of non-beamforming device 103 in wireless communication therewith.

At block 602, processor 220 can determine a signal strength of non-beamforming device 103 at beamforming device 101.

At block 603, processor 220 can determine whether the signal strength, of non-beamforming device 103 at beamforming device 101, is above a threshold signal strength, thereby indicating that non-beamforming device 103 is proximal to beamforming device 101. The threshold signal strength, when present, can be configured at application 436 and/or stored separately (not depicted) from application 436 in memory 222.

When processor 220 determines that the signal strength, of non-beamforming device 103 at beamforming device 101 is not greater than the threshold signal strength (a "No" decision at block 603), either method 600 can end, or blocks 602, 603 can be repeated until a "Yes" decision occurs at block 603.

When processor 220 determines that the signal strength, of non-beamforming device 103 at beamforming device 101 is greater than the threshold signal strength (a "Yes" decision at block 603), at block 605, processor 220 can transmits, using communication interface 224, identifier 340 to access point 105.

At block 607, processor 220 can receive, from access point 105, characteristics 341 of non-beamforming device 103, assuming that identifier 340 and characteristics 341 of non-beamforming device 103 are stored at access point.

At block 608, processor 220 determines, from characteristics 341 of non-beamforming device 103, a feedback matrix of non-beamforming device 103.

At block 609, processor 220 transmits the feedback matrix to access point 105.

Figure 11:
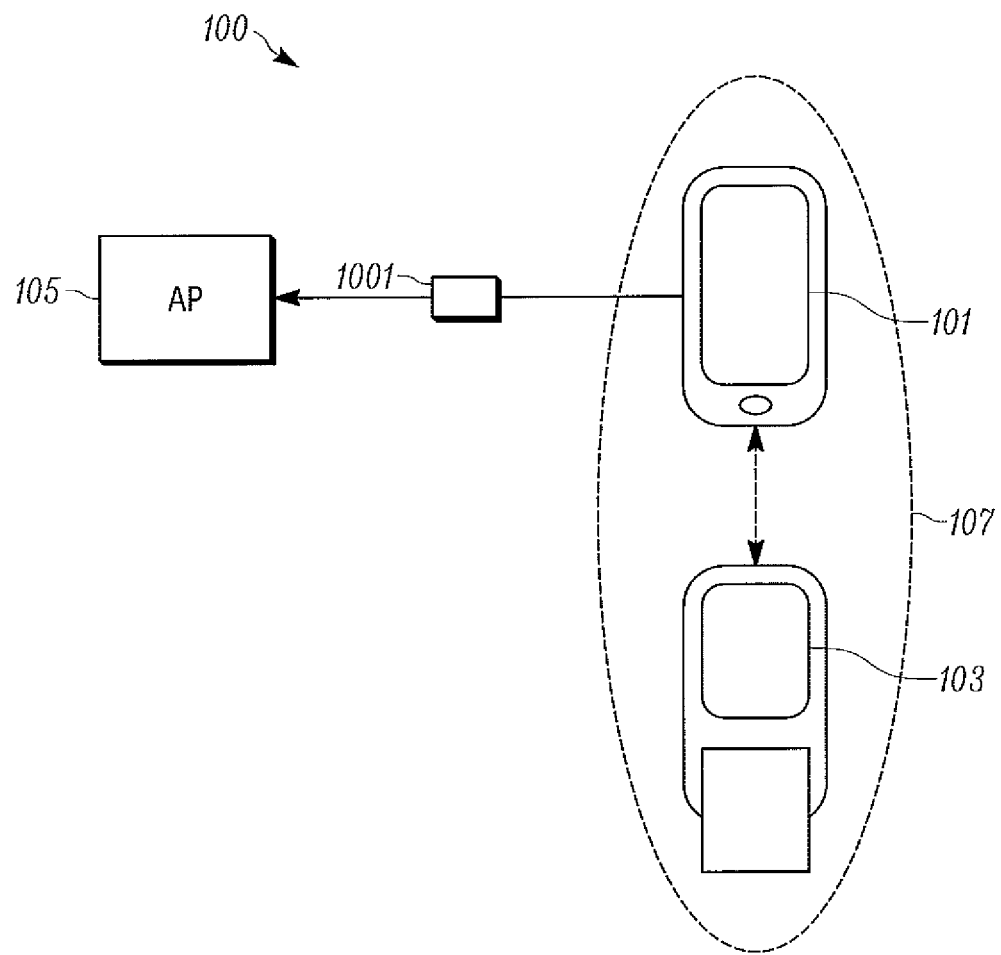
FIG. 11 depicts the access point of the system of FIG. 1 implementing a portion of the method of FIG. 5, and the beamforming device of the system of FIG. 1 implementing a portion of the method of FIG. 6, according to non-limiting implementation.
Figure 12:
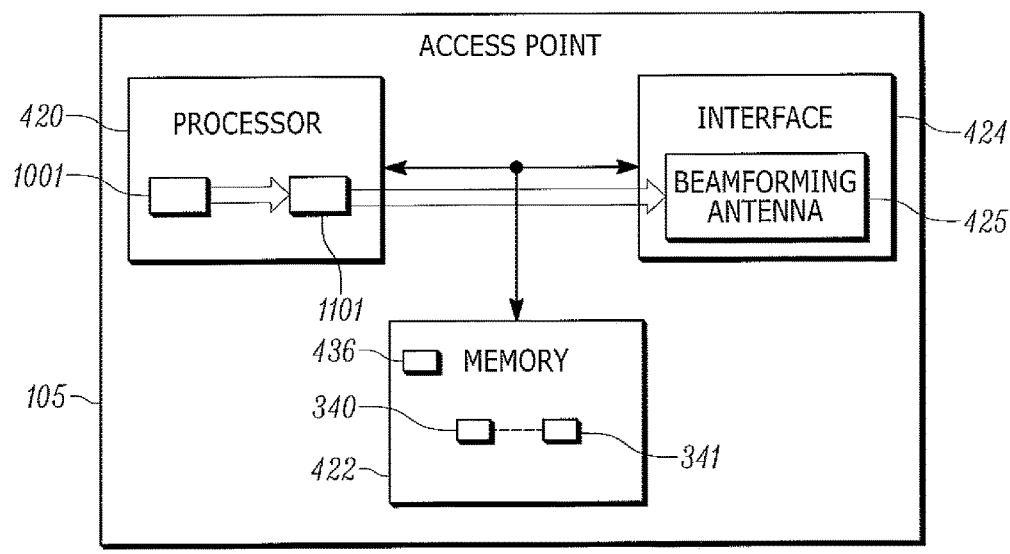
FIG. 12 depicts the access point of FIG. 4 controlling a communication interface to beam form in communications with a non-beamforming device, according to non-limiting implementations.

Specific non-implementations of methods 500, 600 will now be described in more detail with respect to: FIGS. 7, 9, 11 and 13, each of which is substantially similar to FIG. 1, with like elements having like numbers; FIGS. 8 and 12, each of which is substantially similar to FIG. 1, with like elements having like numbers each of which is substantially similar to FIG. 4, with like elements having like numbers; and FIG. 10, which is substantially similar to FIG. 2, with like elements having like numbers.

Furthermore, in the remainder of the specification, beamforming communications between devices will be indicated with solid lines, while non-beamforming communications between devices will be indicated with broken lines. It is further assumed that communications between AP 105 and devices 101, 103 occur using a wireless local communication network and/or a wireless local area network including, but not limited to, a WiFi network. Similarly, it is assumed that communications between devices 101, 103 occur using a local wireless link including, but not limited to a wireless local area network formed by interfaces 224, 324 of devices 101, 103, a WiFi connection there between, a Bluetooth™ connection there between, a Zigbee™ connection there between, and the like.

Figure 7:
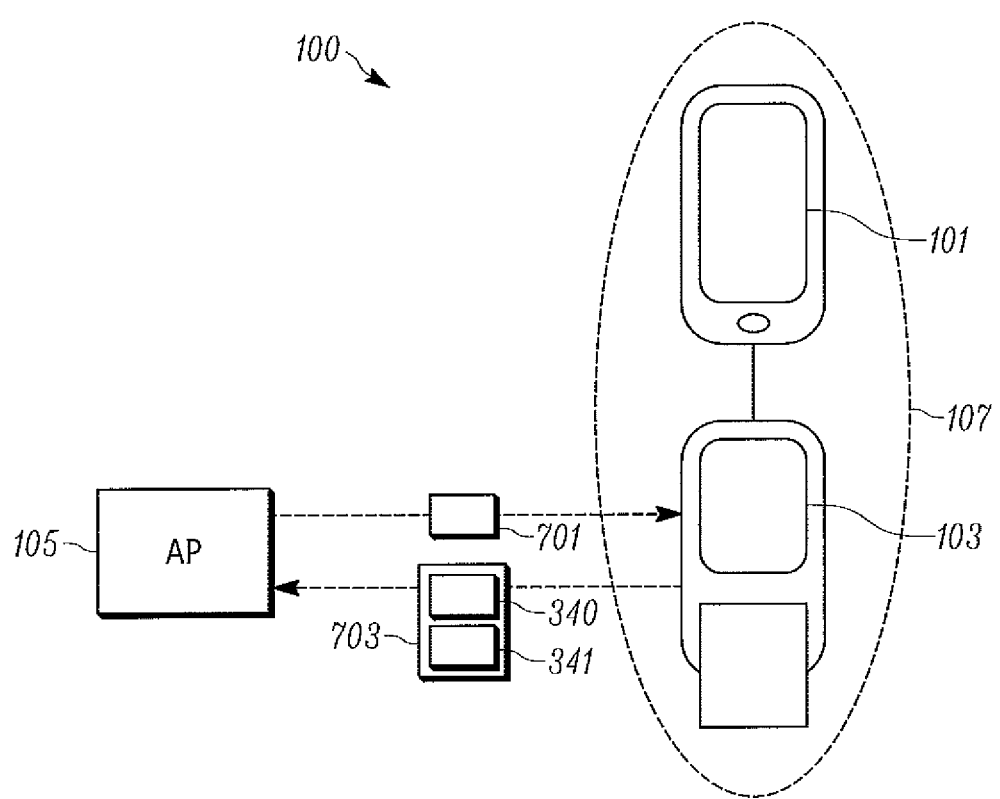
FIG. 7 depicts the access point of the system of FIG. 1 implementing a portion of the method of FIG. 5, according to non-limiting implementation.
Figure 8:
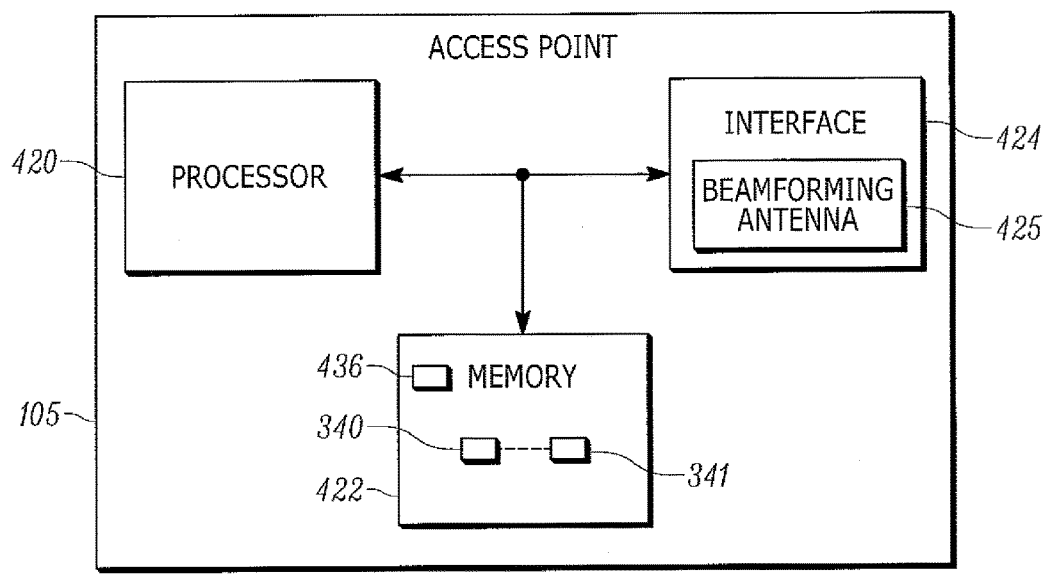
FIG. 8 depicts the access point of FIG. 4 implementing a portion of the method of FIG. 5, according to non-limiting implementation

FIG. 7 and FIG. 8 depict a non-limiting implementation of blocks 501, 503. In FIG. 7, AP 105 transmits, to device 103, a request 701 for identifier 340 and characteristics 341; and device 103 responds by transmitting a response 703 that includes identifier 340 and characteristics 341. Hence, processor 420 of AP 105 (e.g. at block 501), receives identifier 340 and characteristics 341 of non-beamforming device 103 by initially communicating with non-beamforming device 103 using communication interface 424 in a non-beamforming mode (i.e. communications between AP 105 and device 103 in FIG. 7 occur locally, and using non-beamforming communication).

As depicted at FIG. 8, processor 420 (e.g. at block 503) stores identifier 340 and characteristics 341 in association with each other at memory 422 (as indicated by the broken line there between). While not depicted, identifier 340 and characteristics 341 can be stored in a database, a table, and the like at memory 422 and/or in any suitable format.

Figure 9:
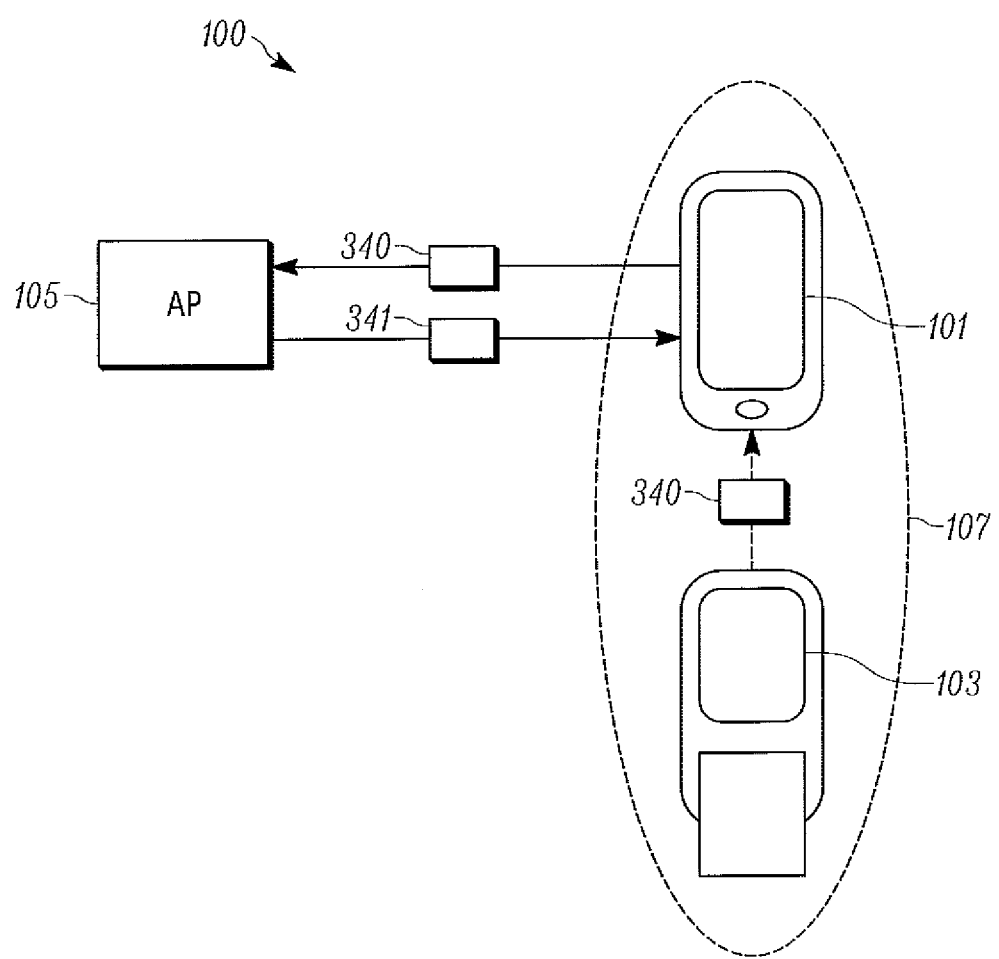
FIG. 9 depicts the access point of the system of FIG. 1 implementing a portion of the method of FIG. 5, and the beamforming device of the system of FIG. 1 implementing a portion of the method of FIG. 6, according to non-limiting implementation.

FIG. 9 depicts a non-limiting implementation of blocks 505 and 507 of method 500 and blocks 601 to 607 of method 600. When devices 101, 103 are in communication (e.g. in a non-beamforming mode), device 101 (e.g. at block 601) receives, from device 103, identifier 340. Device 103 can transmit identifier 340 when at least one of devices 101, 103 detect communication with each other; in some of these implementations, device 101 can request identifier 340; and, in other implementations device 103 can push identifier 340 to device 101.

Device 101 (e.g. at block 605) can transmit identifier 340 to AP 105. In some of these implementations, device 101 (e.g. at block 602) can further determine a signal strength of device 103, for example of a local communication link between devices 101, 103 when identifier 340 is received from device 103; transmission of identifier 340 to AP 105 can further be conditional (e.g. at block 603) on the signal strength being above the threshold signal strength. The threshold signal strength can be selected to indicate proximity between devices 101, 103 (including, but not limited to, at given position 107).

Furthermore, when the signal strength is determined, device 101 can optionally transmit (e.g. at block 605) the signal strength, with identifier 340, to AP 105.

As further depicted in FIG. 9, AP 105 (e.g. at block 505) receives identifier 340 (and optionally the signal strength of device 103) from device 101 and, in response (e.g. at block 507), uses identifier 340 to retrieve characteristics 341 from memory 422 and transmit, to device 101, characteristics 341.

When AP 105 receives the signal strength in association with identifier 340, processor 420 of AP 105 can be further configured to compare the signal strength to the threshold signal strength (which can optionally be stored in application 436 or separately in memory 422), and transmission of characteristics 341 can be conditional on the signal strength being above the threshold signal strength. In other words, in these implementations, block 603 may not occur at device 101; rather, a similar comparison of the signal strength to a threshold signal strength can occur at AP 105.

Either way (and presuming the signal strength is greater than the threshold signal strength when such a comparison occurs at AP 105), processor 420, of AP 105, transmits, to beamforming device 101, characteristics 341 of non-beamforming device 103; as discussed below, the feedback matrix received from beamforming device 101 at block 509 is based on characteristics 341 of non-beamforming device 103.

As depicted, communication between device 101 and AP 105 occurs according to beamforming communications; hence, it is assumed in FIG. 9 that device 101 and AP 105 have exchanged feedback matrices and have further determined beamforming matrices for communications there between. Alternatively, communication between device 101 and AP 105 can occur according to non-beamforming communications.

Figure 10:
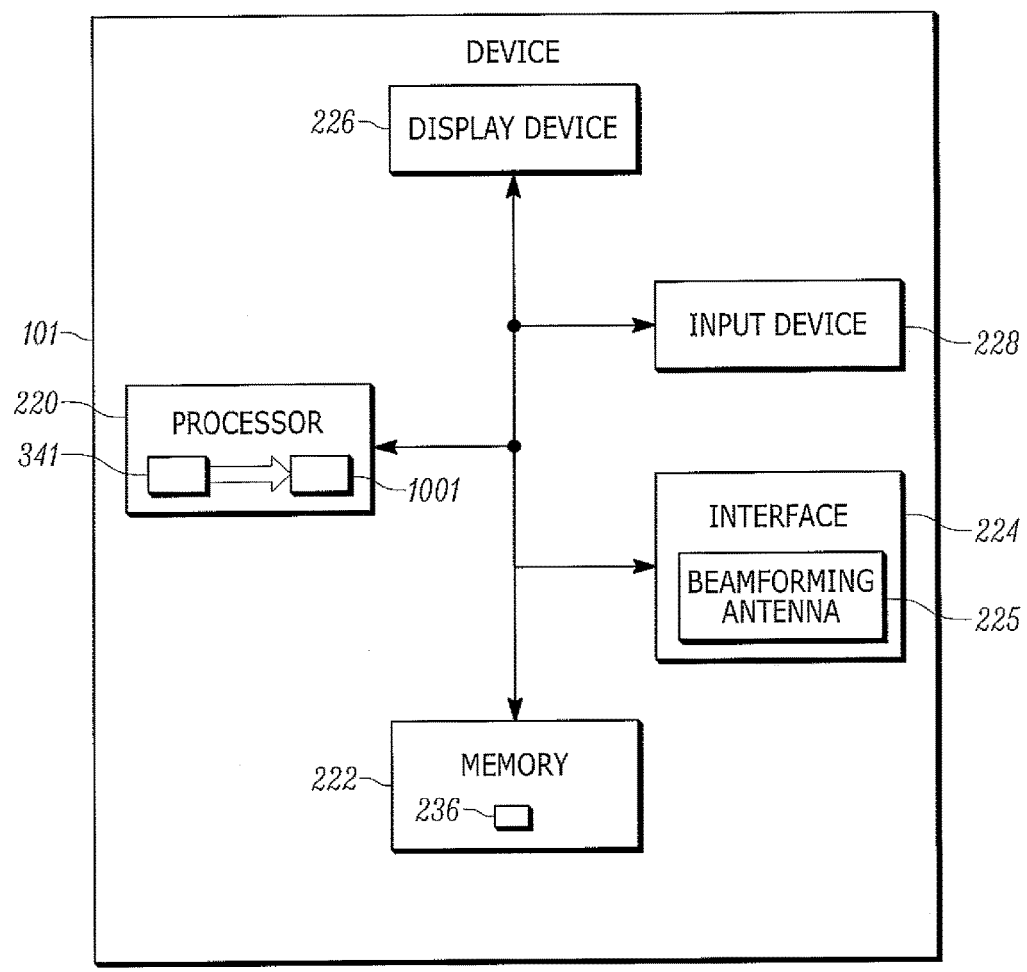
FIG. 10 depicts the beamforming device of FIG. 2 implementing a portion of the method of FIG. 6, according to non-limiting implementation

Attention is next directed to FIG. 10, which depicts device 101 after receipt of characteristics 341; in particular, (e.g. at block 608) processor 220 determines, from characteristics 341 of non-beamforming device 103, a feedback matrix 1001 of non-beamforming device 103; methods for determining feedback matrices will occur to persons skilled in the art. Further, FIG. 11 depicts device 101 (e.g. at block 609) transmitting feedback matrix 1001 of non-beamforming device 103 to AP 105 and/or AP 105 (e.g. at block 509), receiving feedback matrix 1001 of non-beamforming device 103.

Figure 13:
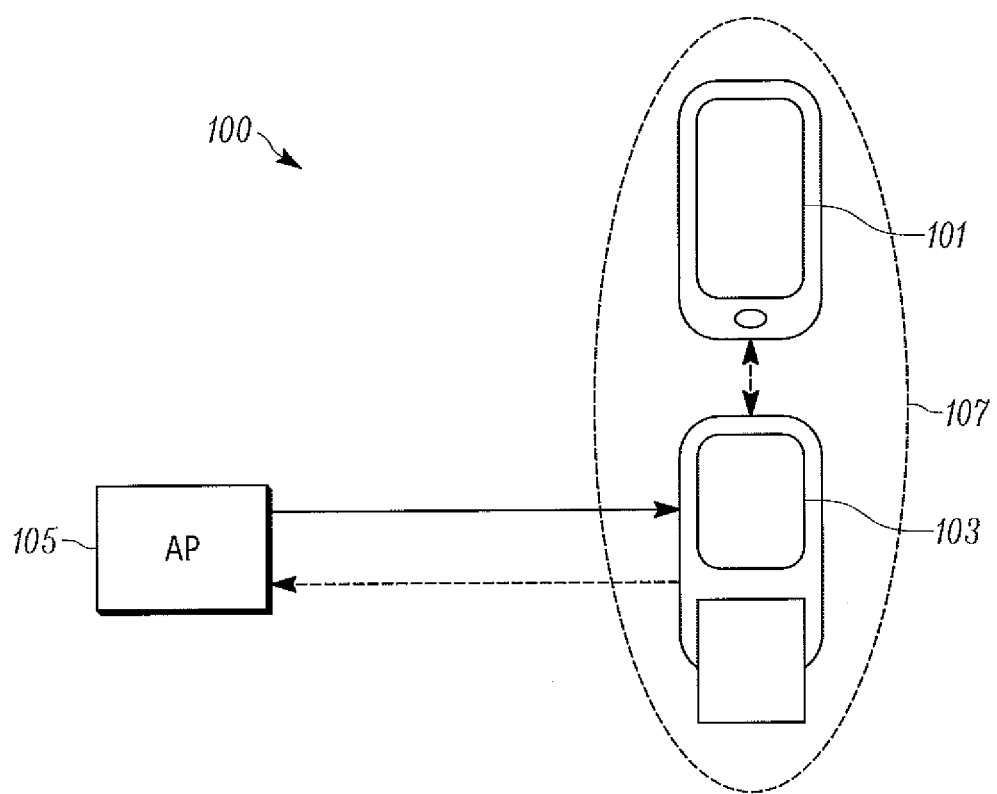
FIG. 13 depicts the access point of the system of FIG. 1 communicating with the non-beamforming device of the system of FIG. 1 using beamforming, according to non-limiting implementation.

Attention is next directed to FIG. 12, which depicts AP 105 after receipt of feedback matrix 1001; in particular (e.g. at block 511), processor 420 determines a beamforming steering matrix 1101 from feedback matrix 1001. Methods for determining beamforming steering matrices from a feedback matrix will occur to persons skilled in the art. FIG. 12 and FIG. 13 further depict AP 105 and/or processor 420 controlling communication interface 424 (and in particular beamforming antenna 425) using beamforming steering matrix 1101 to communicate with non-beamforming device 103 located at given position 107: in other words, in FIG. 13, an arrow from AP 105 to non-beamforming device 103 is a solid line (e.g. as compared to FIG. 7) indicating that AP 105 is using a beamforming mode to communicate with non-beamforming device 103. However, non-beamforming device 103 continues to communicate with AP 105 using non-beamforming communications as non-beamforming device 103 is not configured for beamforming (as indicated by the arrow from device 103 to AP 105 being a broken line).

In some implementations, AP 105 can monitor signal strength of communications from device 103, and switch to non-beamforming communications with device 103 when the signal strength drops below a threshold signal strength (which can be the same or different as the signal strength used in block 603 of method 600). Furthermore, in these implementations, the threshold signal strength can be dynamic; for example, the threshold signal strength can be set at a value related to an initial signal strength of device 103 when beamforming communications from AP 105 to device 103 begin (e.g. the threshold signal strength can be about 10% less than the initial signal strength) such that when the signal strength drops below the threshold signal strength (and/or by 10% and/or at a given rate), AP 105 can determine that device 103 is no longer at given position 107 (and/or moving away from given position 107), and hence further use of beamforming steering matrix 1101 could degrade communications with device 103. As such AP 105 can return to a non-beamforming mode when communicating with device 103.

Alternatively, device 101 can continue to monitor a signal strength of device 103; and, when the strength of device 103 drops below the threshold signal strength at device 101, device 101 can transmit an indication of such to AP 105 to trigger AP 105 to switch to a non-beamforming mode in communications with device 103; in other words, device 101 can determine that device 103 is no longer proximal thereto and transmit an indicator of such to AP 105.

However, such implementations can assume that device 103 has moved from given position 107, while device 101 remains stationary at given position 107. However, as device 101 can be mobile, device 101 can move from given position 107, while device 103 remains at given position 107. Hence, in some implementations, one or more of devices 101, 103 can comprise a respective location determining device (including, but not limited to, GPS (Global Positioning System) devices), and whether or not AP 105 communicates with device 103 using a beamforming mode or a non-beamforming mode can be conditional on a position of device 103 as determined by a location determining device. In other words, one or more of devices 101, 103 can determine a position of device 103, and one or more of: transmit an indication to AP 105 to switch to non-beamforming communications with device 103 (e.g. when device 103 is no longer at given position 107); and one or more of devices 101, 103 can transmit the position of device 103 to AP 105 which can determine, based on the position of device 103, to switch to non-beamforming communications with device 103 (e.g. when device 103 is no longer at given position 107)

Alternatively, device 101 and/or device 103 can include a proximity sensor, and whether or not AP 105 used beamforming communications or non-beamforming communications when communicating with device 103 can depend on proximity of device 103 to device 101.

Yet further implementations and modifications and changes are within the scope of present implementations. For example, rather than AP 105 retrieving identifier 340 and characteristics 341 of device 103 at block 501 (as in FIG. 7), device 101 can receive characteristics 341 of device 103 with identifier 340 at block 601 and (skipping at least blocks 605, 607 of method 600), determine feedback matrix 1001 at block 608 from characteristics 341 received from device 103. Hence, in these implementations AP 105 can skip blocks 501 to 509.

Furthermore, while in FIG. 7 and FIG. 8, memory 422 is provisioned with identifier 340 and characteristics 341 by communicating with device 103, when device 103 is at given position 107, such provisioning is not dependent on device 103 being at given position 107; indeed, neither is such provisioning dependent on AP 105 receiving identifier 340 and characteristics 341 from device 103. For example, identifier 340 and characteristics 341, as has already been discussed, identifier 340 and characteristics 341 can optionally be received at device 101; in such implementations device 101 can transmit identifier 340 and characteristics 341 to AP 105 whether device 103 remains proximal to device 101 or not. Furthermore identifier 340 and characteristics 341 can be received (and provisioned at memory 422) at AP 105 from another device and/or another AP (not depicted) and/or at a factory and/or in a provisioning process and/or when device 103 is not at given position 107.

Hence, AP 105 comprises memory 422 which can store characteristics 341 of non-beamforming device 103 in association with identifier 340 of non-beamforming device 103. In some implementations, processor 420 of AP 105 is further configured to: receive from beamforming device 101, identifier 340 of non-beamforming device 103, non-beamforming device 103 being proximal to, and in communication with, beamforming device 101 at given position 107; and, transmit, to beamforming device 101, characteristics 341 of non-beamforming device 103, feedback matrix 1001 received from beamforming device 101 based on characteristics 341 of non-beamforming device 103.

As already described, alternatively, processor 420 of AP 105 can be further configured to: receive from beamforming device 101, identifier 340 of non-beamforming device 103 in association with a respective signal strength of non-beamforming device 103 at beamforming device 101, non-beamforming device 103 being in communication with beamforming device 101 at given position 107; when the signal strength is above a threshold signal strength, transmit, to beamforming device 101, characteristics 341 of non-beamforming device 103, feedback matrix 1001 received from beamforming device 101 based on characteristics 341 of non-beamforming device 103; and when the signal strength is below the threshold signal strength, communicate with non-beamforming device 103 using communication interface 424 in a non-beamforming mode.

In particular, non-limiting implementations, communications between devices 101, 103 and AP 105 can occur according to particular communication standards, including, but not limited to, communications standards associated with MIMO (multiple-input and multiple-output) communication in WiFi, and in particular, SU-MIMO (single-user-MIMO) communications in the 802.11ac standard. For example, referring again to FIG. 9, identifier 340 can comprise a MAC address of device 103, and characteristics 341 can be transmitted to device 101 in a NDP (Null Data Packet) announcement using SU-MIMO, the NDP announcement also acting as a sounding announcement that includes characteristics 341 of device 103, to "spoof" device 101 into providing feedback matrix 1001 as a proxy for device 103. Furthermore, AP 105 can determine beamforming steering matrix 1101 according to SU-MIMO beamforming. While MU-MIMO (multi-user-MIMO) could also be used in system 100, device 103 may not be compatible with MU-MIMO as, in general, device 103 can operate according to older standards that are not compatible with MU-MIMO. However, in some implementations, device 103 can be modified for compatibility with such newer standards, and such newer standards can be used in system 100.

Figure 14:
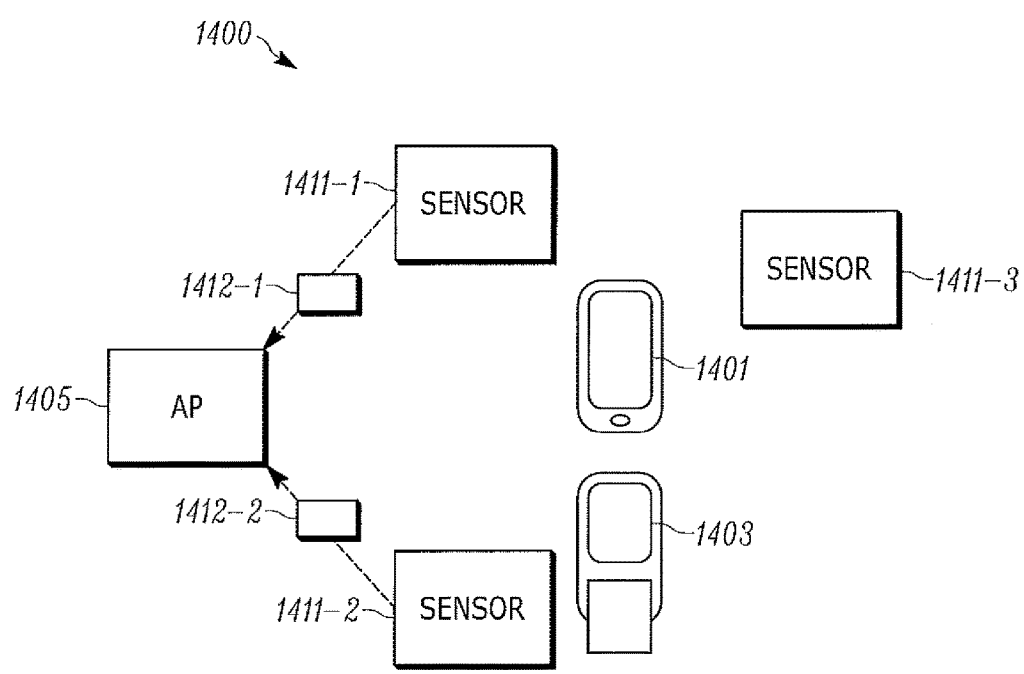
FIG. 14 depicts a schematic diagram of an alternative system for providing communications between a beamforming access point and a non-beamforming device, according to non-limiting implementations.

Attention is next directed to FIG. 14 which depicts an alternative system 1400 for providing communications between a beamforming access point and a non-beamforming device. System 1400 is substantially similar to system 100, with like elements having like numbers, however in a "1400" series rather than a "100" series. Hence, for example, system 1400 comprises a beamforming device 1401 (interchangeably referred hereafter as device 1401), a non-beamforming device 1403 (interchangeably referred hereafter as device 1403), and an access point 1405 (interchangeably referred hereafter as AP 1405). However, in contrast to system 100, system 1400 further comprises location sensors 1411-1, 1411-2, 1411-3, each configured to: determine when a device 1401, 1403 is proximal thereto and/or determine a position of device 1401, 1403, and transmit data indicative of a respective position of device 1401, 1403 to AP 1405.

Locations sensors 1411-1, 1411-2, 1411-3 will be interchangeably referred to, hereafter, as sensors 1411 and, generically, as a sensor 1411. Furthermore, while three sensors 1411 are depicted in FIG. 14, system 1400 can comprise fewer than three sensors 1411, and more than three sensors 1411. Indeed, a plurality of sensors 1411 can be mounted in a space where AP 1405 is deployed, for example in a grid arrangement, such that a position of device 1401, 1403 can be determined anywhere within the grid arrangement. Each sensor 1411 can comprise one or more of a location sensing tag, a WiFi enabled sensor, a Bluetooth™ enabled sensor (including, but not limited to, a BLE™ (Bluetooth™ Low Energy) tag, a Bluetooth™ smart tag, an iBeacon™ tag), a Zigbee™ and enabled sensor, the like, though other types of location sensors are within the scope of present implementations.

Furthermore, each of location sensors 1411 can store a respective position of where, in a physical space, each location sensor 1411 is mounted. Alternatively, AP 1405 can have access to a table, a database and the like of a position of each location sensor 1411 stored in association with an identifier thereof (e.g. at a memory of AP 1405 and/or a location tracking server (not depicted) in communication with AP 1405 via a suitable wired and/or wireless communication link.

Either way, AP 1405 can receive, from one or more location sensors 1411, using a communication interface, data 1412 indicative of positions of each of beamforming device 1401 and non-beamforming device 1403. As depicted, such communications can occur in a non-beamforming mode, unless sensors 1411 are themselves enabled for beamforming, and exchange of feedback matrices between AP 1405 and sensors 1411 has occurred.

While in FIG. 14, each sensor 1411 is depicted as transmitting data 1412 to AP 1405, in other implementations, one or more of sensors 1411 can transmit data 1412 to AP 1405 via adjacent sensors (e.g. in a mesh network) and/or any intermediate devices, including, but not limited to either of devices 1401, 1403. In other words, one or more of sensors 1411 can sense a position of devices 1401, 1403, and transmit data 1412 to a proximal device 1401, 1403, which in turn can transmit data 1412 to AP 1405.

Data 1412 can include, but is not limited to: an identifier of a device 1401, 1403 (e.g. as retrieved by a respective sensor 1411 from devices 1401, 1403 in communication therewith), along with a respective position of a respective sensor 1411; and/or an identifier of a device 1401, 1403, along with a respective identifier of a respective sensor 1411 that has detected that a respective device 1401, 1403 is proximal thereto (such that a position of the respective sensor 1411 that has detected a respective device 1401, 1403 can be determined and hence, also a respective position of each device 1401, 1403).

For example, as also depicted in FIG. 14, sensor 1411-1 has detected device 1401 (and, in some implementations, retrieved an identifier therefrom), and sensor 1411-2 has detected device 1403 (and, in some implementations, retrieved an identifier therefrom). Hence, sensor 1411-1 transmits, to AP 1405, data 1412-1 indicative of a position of device 1401; and sensor 1411-2 transmits, to AP 1405, data 1412-2 indicative of a position of device 1403. Data 1412-1, 1412-2 will be interchangeably referred to, hereafter, as data 1412 and, generically, as a set of data 1412.

Figure 15:
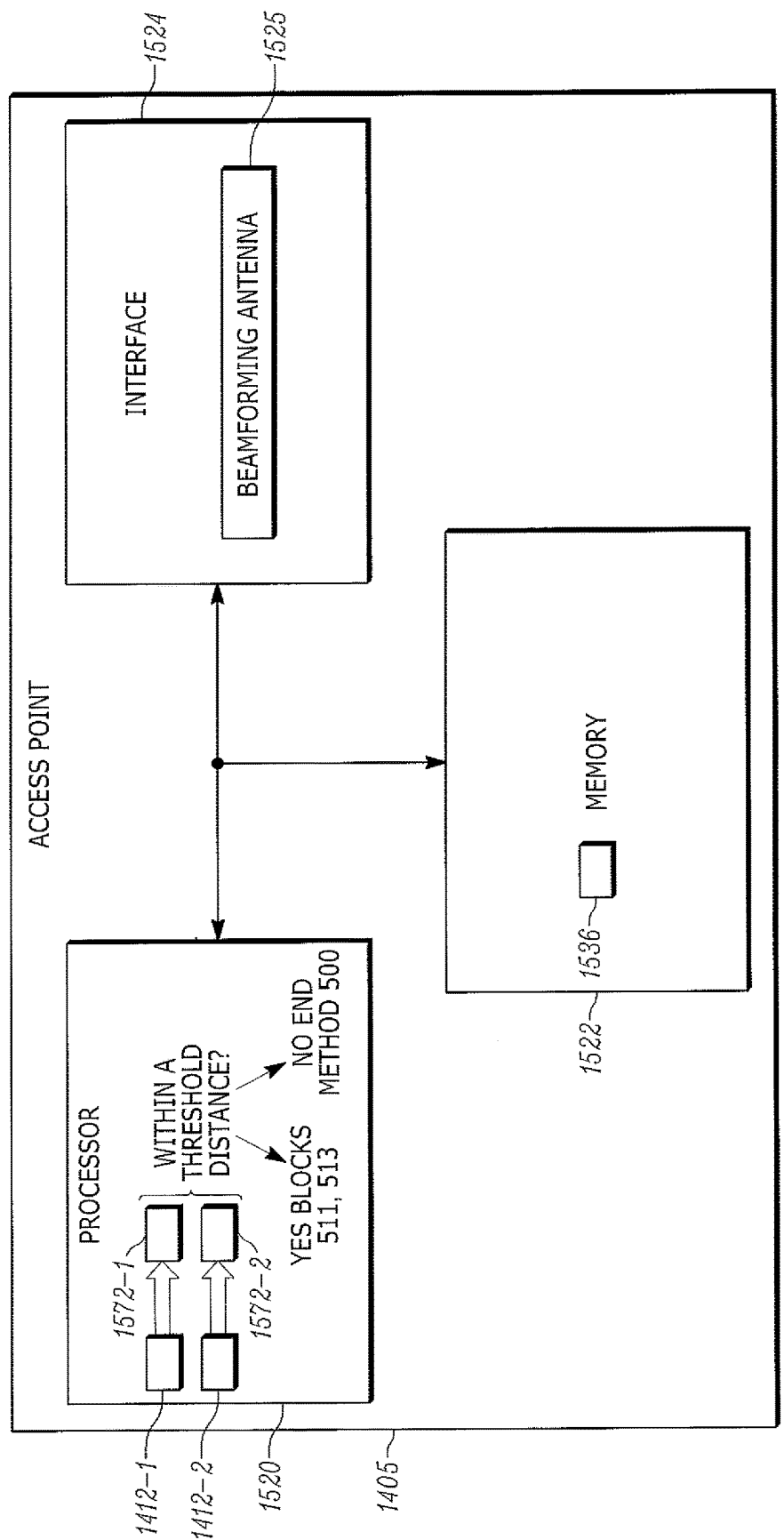
FIG. 15 depicts a schematic diagram of an alternative beamforming access point used with the system of FIG. 14, according to non-limiting implementations.

Hence, attention is next directed to FIG. 15 which depicts a schematic diagram of AP 1405, which is substantially similar to FIG. 4, with like elements having like numbers, however in a "1500" series rather than a "400" series. Hence, AP 1405 comprises a processor 1520, a memory 1522, a communication interface 1524, which in turn comprises a beamforming antenna 1525. Processor 1520, memory 1522, communication interface 1524 (interchangeably referred to hereafter as interface 1524), and beamforming antenna 1525 are respectively similar to processor 420, memory 422, communication interface 424, and beamforming antenna 425 of AP 105.

Memory 1522 stores an application 1536 which, when processed by processor 1520, enables processor 1520 to implement at least blocks 511, 513 of method 500; specifically, application 1536, when processed by processor 1520, enables processor 1520 to: determine a beamforming steering matrix from a feedback matrix received from beamforming device 1401 located at a given position; and, control communication interface 1524 to beam form using the beamforming steering matrix to communicate with non-beamforming device 1403 located at the given position.

However, processor 1520 is further configured to (e.g. upon processing application 1536) to: receive, from one or more location sensors 1411, using the communication interface 1524, data 1412 indicative of positions of each of beamforming device 1401 and non-beamforming device 1403; and, control communication interface 1524 to beam form using the beamforming steering matrix to communicate with non-beamforming device 1403 only when beamforming device 1401 and non-beamforming device 1403 are within a given threshold distance.

In other words, at AP 1405, implementation of blocks 511, 513 of method 500 are conditional on beamforming device 1401 and non-beamforming device 1403 being within a given threshold distance, which can be configured at application 1536 and/or stored separately from application 1536 in memory 1522.

Indeed, FIG. 15 further depicts data 1412-1, 1412-2 being processed at processor 1520 to determine a respective position 1572-1, 1572-2 of device 1401 and device 1403, which can be extracted from data 1412-1, 1412-2 and/or retrieved from a location sensing server using a respective identifier of each of sensors 1411-1, 1411-2 received in data 1412-1, 1412-2. FIG. 15 also depicts processor 1520 comparing positions 1572-1, 1572-2: when positions 1572-1, 1572-2 are within a threshold distance, blocks 511, 513 of method 500 are implemented and AP 1405 communicates with device 1403 in a beamforming mode; and when positions 1572-1, 1572-2 are not within a threshold distance, method 500 (if started) ends, and AP1405 communicates with device 1403 in a non-beamforming mode. While not depicted, each positions 1572-1, 1572-2 can be further associated with a respective identifier of devices 1401, 1403.

Similar to implementations described above, when AP 1405 is communicating with device 1403 in a beamforming mode, AP 1405 can switch to communicating with device 1403 in a non-beamforming mode when device 1403 changes position, as determined, for example, by further data from one or more sensors 1411.

Figure 16:
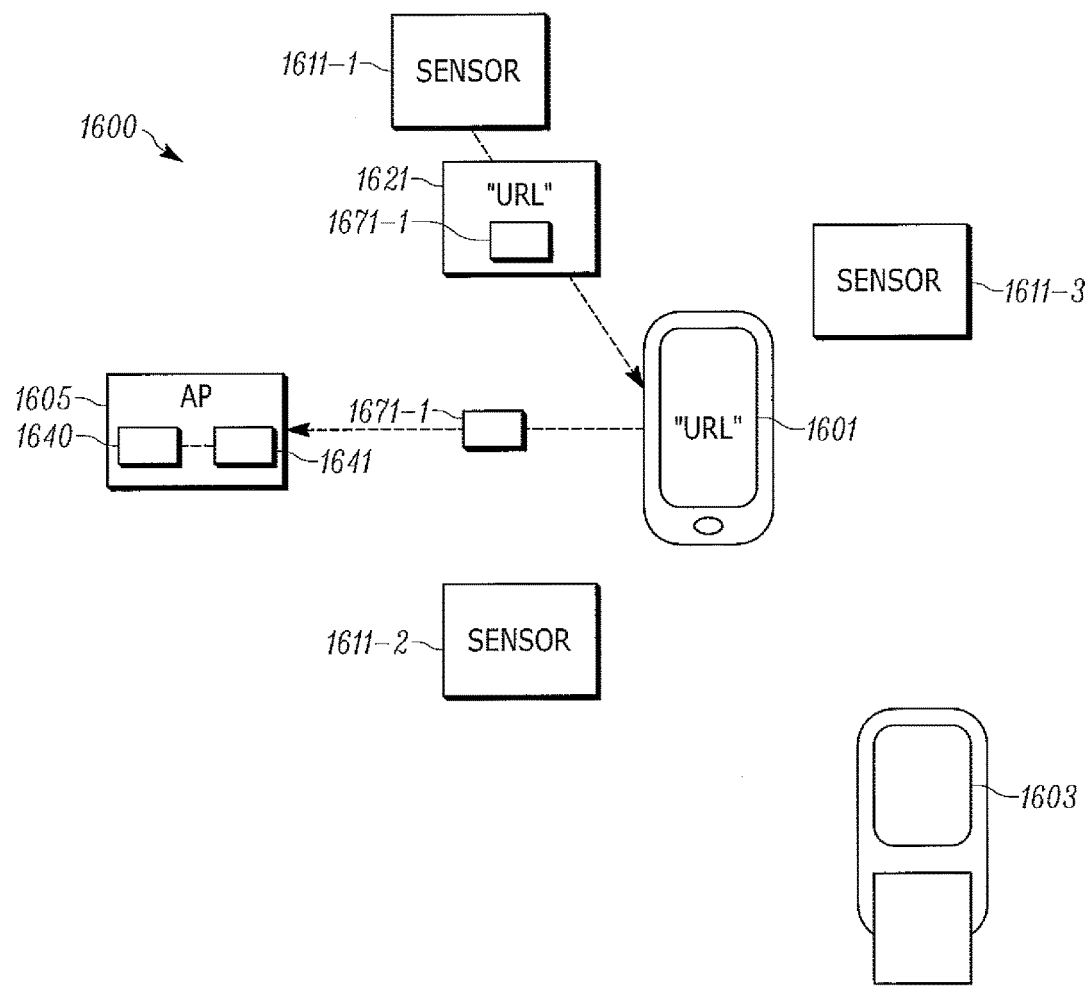
FIG. 16 depicts a schematic diagram of an alternative system for providing communications between a beamforming access point and a non-beamforming device, according to non-limiting implementations.

Attention is next directed to FIG. 16 which depicts an alternative system 1600 for providing communications between a beamforming access point and a non-beamforming device. System 1600 is substantially similar to system 1400, with like elements having like numbers, however in a "1600" series rather than a "1400" series. Hence, for example, system 1600 comprises a beamforming device 1601 (interchangeably referred hereafter as device 1601), a non-beamforming device 1603 (interchangeably referred hereafter as device 1603), an access point 1605 (interchangeably referred hereafter as AP 1605), and locations sensors 1611-1, 1611-2, 1611-3, each configured to determine when a device 1601, 1603 is proximal thereto and/or configured to determine a position of device 1601, 1603, and transmit data indicative of a respective position of device 1601, 1603 to AP 1605.

Locations sensors 1611-1, 1611-2, 1611-3 will be interchangeably referred to, hereafter, as sensors 1611 and, generically, as a sensor 1611. Furthermore, while three sensors 1611 are depicted in FIG. 16, system 1600 can comprise fewer than three sensors 1611, and more than three sensors 1611. Indeed, a plurality of sensors 1611 can be mounted in a space where AP 1605 is deployed, for example in a grid arrangement, such that a position of device 1601, 1603 can be determined anywhere within the grid arrangement. Each sensor 1611 can be similar to sensors 1411 as described above.

In contrast to system 1400, in system 1600, devices 1601, 1603 are not initially proximal to one another; indeed, implementation of method 500 at AP 1605, and method 600 at device 1601, is not dependent on devices 1601, 1603 being concurrently proximal and/or concurrently in a same given location, as in systems 100, 1400.

Rather, in system 1600, device 1601 is, at different times, adjacent and/or proximal to each of sensors 1611. Alternatively, system 1600 can comprises a plurality of devices similar to device 1601, and such devices are, at different or similar times, adjacent and/or proximal to each of sensors 1611. Furthermore, in system 1600, devices 1601, 1603 need not ever be in proximity to one another.

It is further assumed in system 1400 that AP 1605 has been provisioned with an identifier 1640 of device 1603 (similar to identifier 340) and associated characteristics 1641 (similar to characteristics 341). Such provisioning can occur at a factory, and/or in a provisioning process, and/or when device 1603 is in communication with AP 1605 (e.g. AP 1605 can request characteristics 1641 from device 1603, in a manner similar to that depicted in FIG. 7).

As further depicted in FIG. 16, device 1601 is initially proximal sensor 1611-1; sensor 1611-1 senses such proximity and transmits (e.g. in a push operation), to device 1601, data 1621 which can comprise data for rendering at a display device of device 1601 including, but not limited to, an electronic coupon, a redirection link, in and the like. As depicted, data 1621 is rendered as a "URL", or uniform resource locator, for example in a browser application at device 1601 at a display device of device 1601. However, data 1621 further includes an identifier 1671-1 which identifiers sensor 1611-1 and/or a position of sensor 1611-1; in some implementations, identifier 1671-1 can be embedded in a redirection link. When the data for rendering at a display device of device 1601, such as "URL" is selected at the display device (e.g. to access coupon and/or a service associated with data 1621), at least identifier 1671-1 is transmitted to AP 1605, which causes AP 1605 to implement at least blocks 511, 513 of method 500 using characteristics 1641 to determine a beamforming steering matrix of device 1603 when device 1603 is later located proximal sensor 1611-1. Alternatively, data 1621 can be transmitted to AP 1605, including identifier 1671-1.

Transmission of at least identifier 1671-1 can occur in beamforming communications or non-beamforming communications. When transmitted using non-beamforming communications (as depicted), AP 1605 can initiate a verification process to verify whether at least identifier 1671-1 was transmitted by a beamforming device. Indeed, implementation of at least block 511, 513 can be conditional on AP 1605 verifying that device 1601 comprises a beamforming device.

In implementations where identifier 1671-1 identifies sensor 1611-1, but does not include a position of sensor 1611-1, AP 1605 can request a location of sensor 1611-1 using identifier 1671-1 from, for example, a location tracking server (not depicted), as described above.

Such processes can be performed for each sensor 1611 such that AP 1605 is provisioned with beamforming steering matrices of device 1603, for each location of each sensor 1611.

Figure 17:
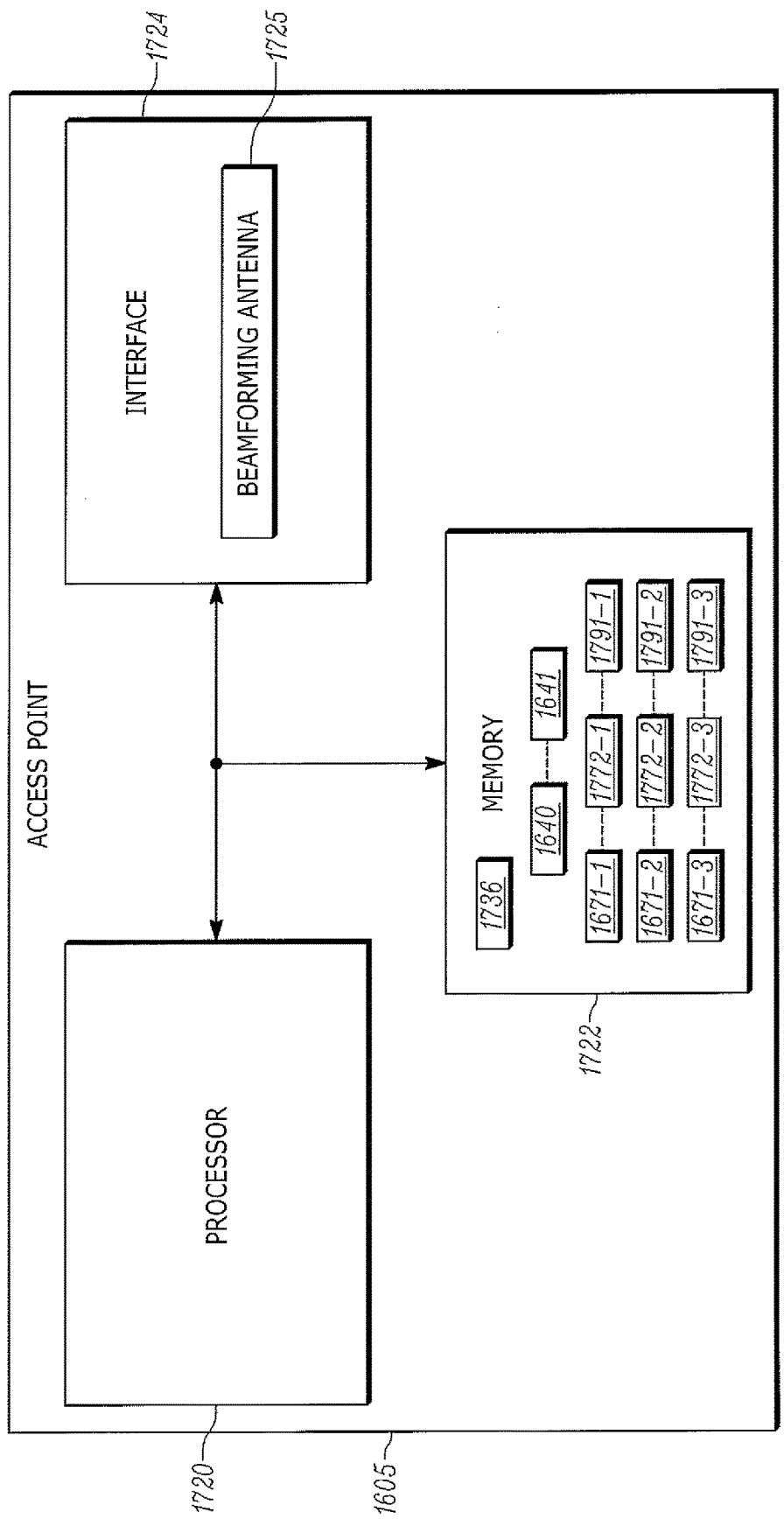
FIG. 17 depicts a schematic diagram of an alternative beamforming access point used with the system of FIG. 16, according to non-limiting implementations.

Hence, attention is next directed to FIG. 17 which depicts a schematic diagram of AP 1605, which is substantially similar to FIG. 4, with like elements having like numbers, however in a "1700" series rather than a "400" series. Hence, AP 1605 comprises a processor 1720, a memory 1722, a communication interface 1724, which in turn comprises a beamforming antenna 1725. Processor 1720, memory 1722, communication interface 1724 (interchangeably referred to hereafter as interface 1724), and beamforming antenna 1725 are respectively similar to processor 420, memory 422, communication interface 424, and beamforming antenna 425 of AP 105.

Memory 1722 stores an application 1736 which, when processed by processor 1720, enables processor 1720 to implement at least blocks 511, 513 of method 500; specifically, application 1736, when processed by processor 1720, enables processor 1720 to: determine a beamforming steering matrix from a feedback matrix received from beamforming device 1601 located at a given position; and, control communication interface 1724 to beam form using the beamforming steering matrix to communicate with non-beamforming device 1603 located at the given position.

However, memory 1722 further stores identifier 1640 and characteristics 1641 of device 1603, as well as respective identifiers 1671-1, 1671-2, 1671-3, respectively, of sensors 1411-1, 1411-2, 1411-2, in association with respective given positions 1772-1, 1772-2, 1772-3 of sensors 1411-1, 1411-2, 1411-2 (e.g. when identifiers 1671-1, 1671-2, 1671-3 do not include a position of sensors 1411), and in further association with a beamforming steering matrix 1791-1, 1791-2, 1791-3 associated with each sensor 1411, and determined using at least blocks 511, 513 of method 500.

Identifiers 1671-1, 1671-2, 1671-3 will be interchangeably referred to hereafter, collectively, as identifiers 1671 and, generically, as an identifier 1671; positions 1772-1, 1772-2, 1772-3 will be interchangeably referred to hereafter, collectively, as given positions 1772 and, generically, as a given position 1772; and beamforming steering matrix 1791-1, 1791-2, 1791-3 will be interchangeably referred to hereafter, collectively, as beamforming steering matrices 1791 and, generically, as a beamforming steering matrix 1791.

Figure 18:
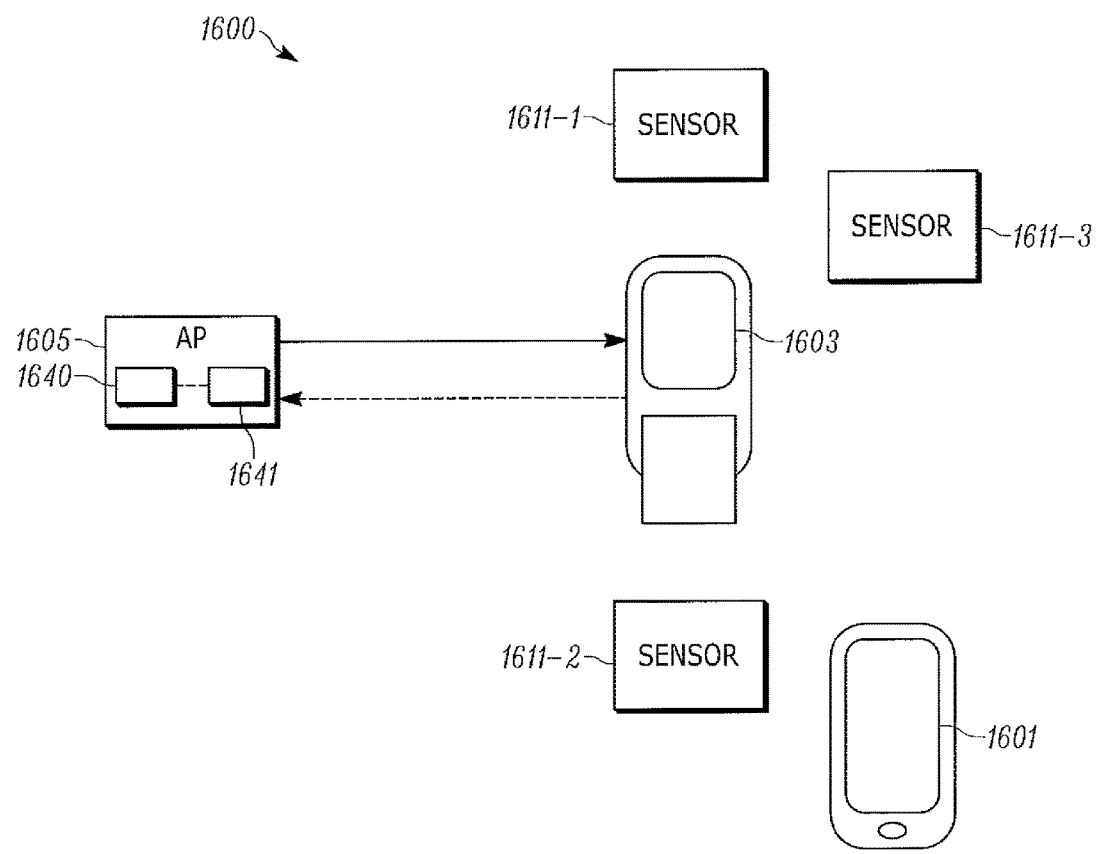
FIG. 18 depicts the access point of the system of FIG. 16 communicating with the non-beamforming device of the system of FIG. 16 using beamforming, according to non-limiting implementation.

Hence, when device 103 is located at a given position 1772 associated with one of sensors 1411, for which a beamforming steering matrix 1791 has been determined using device 101 being previously located at the given position 1772, AP 1605 can use beamforming communications to communicate with device 103 using the associated beamforming steering matrix 1791, as depicted in FIG. 18. In particular, in FIG. 18, which is substantially similar to FIG. 16, with like elements having like numbers, device 103 is adjacent sensor 1611-1, which senses a position of device 103, relays, to AP 1605, data indicative that device 103 is proximal thereto (and/or a position of device 103), in a manner similar to that described with reference to FIG. 14 and FIG. 15; in response, AP 1605 uses beamforming steering matrix 1791-1 to communicate with device 103 using beamforming communications.

Hence, in addition to blocks 511, 513, processor 1720 is further configured to: processor is further configured to: store a beamforming steering matrix 1791 (e.g. as determined using device 1601) in memory 1722 in association with a given position 1772; receive, from one or more location sensors 1611, using communication interface 1724, an indication that the non-beamforming device is located at the given position 1772; and, in response, control communication interface 1724 to beam form using the beamforming steering matrix 1791 to communicate with non-beamforming device 1603 located at given position 1772 only when non-beamforming device 1603 is at the given position 1772. In other words, when device 1603 is not at a given position 1772 associated with one of sensors 1611, AP 1605 uses non-beamforming communications to communicate therewith.

Furthermore, while particular non-limiting implementations have been described that include a sensor 1611 transmitting a URL and the like to device 1601 as a trigger for implementing at least blocks 511, 513 of method 500, in other implementations, a URL, and the like is not transmitted to device 1601. Rather, sensor sensors 1611 can behave similar to sensors 1411 and at least blocks 511, 513 of method 500 can occur at AP 1605 when AP 1605 receives, from a sensor 1611, data indicative of a position of beamforming device 1601 being proximal the sensor 1611.

In yet further implementations, AP 1605 may not be preconfigured with characteristics 1641; rather, when beamforming device 1601 is located at each given position 1772 of a respective sensor 1611, AP 1605 can determine a beamforming steering matrix of device 1601 at each given position 1772, and store the beamforming steering matrix of device 1601 in association with given position 1772 at memory 1722. In these implementations, the beamforming steering matrix of device 1601 can later be used to communicate with device 1601 when device 1601 is again located at a given position 1772. Alternatively, the beamforming steering matrix of device 1601 can be used to communicate with device 1603 (or indeed any non-beamforming device) when device 1603 is located at the given position 1772.

While such implementations may not be as efficient as when beamforming steering matrices for device 1603 are determined using characteristics 1641 of device 1603, such implementations may provide more efficient beamforming communications with device 1603 than with non-beamforming communications. Indeed, in some of these implementations, AP 1605 can further determine a respective quality-of-service (QoS) parameter for each of beamforming communications and non-beamforming communications with device 1603, and use whichever mode results in the better QoS. In other words, AP 1605 can alternately communicate with device 1603 in each of a beamforming mode (using a beamforming steering matrix of device 1601) and a non-beamforming mode, determine a respective QoS parameter for each mode, and switch the mode having the QoS parameter which is indicative of more efficient and/or better communications with device 1603.

Hence, provided herein are systems, devices and methods of providing communications between a beamforming access point and a non-beamforming device. A beamforming device, located at a given position, is used to generate a beamforming feedback matrix using communication characteristics of the non-beamforming device (e.g. the beamforming devices "spoofs" the non-beamforming device), and the beamforming feedback matrix provided by the beamforming device to the beamforming access point is used, by the beamforming access point, to determine a beamforming steering matrix for the non-beamforming device, used to provide beamforming communications therewith, at least when the non-beamforming device is located at the given position, regardless of the current position of the beamforming device.

In the foregoing specification, specific implementations have been described. However, one of ordinary skill in the art appreciates that various modifications and changes can be made without departing from the scope of the specification as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an implementation can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

We claim:

1. An access point comprising:
a processor and a communication interface configured for beamforming, the processor configured to:
determine a beamforming steering matrix from a feedback matrix received from a beamforming device located at a given position;
transmit, to the beamforming device, characteristics of the non-beamforming device, the feedback matrix received from the beamforming device based on the characteristics of the non-beamforming device; and
control the communication interface to beam form using the beamforming steering matrix to communicate with a non-beamforming device located at the given position.

2. The access point of claim 1, further comprising a memory storing the characteristics of the non-beamforming device in association with an identifier of the non-beamforming device, wherein the processor is further configured to:
receive, from the beamforming device, the identifier of the non-beamforming device, the non-beamforming device being proximal to, and in communication with, the beamforming device at the given position; and,
transmit, to the beamforming device, the characteristics of the non-beamforming device, the feedback matrix received from the beamforming device based on the characteristics of the non-beamforming device.

3. The access point of claim 1, further comprising a memory, wherein the processor is further configured to:
determine an identifier and the characteristics of the non-beamforming device by initially communicating with the non-beamforming device using the communication interface in a non-beamforming mode;
store the identifier and the characteristics of the non-beamforming device in the memory;
receive, from the beamforming device, the identifier of the non-beamforming device; and,
transmit, to the beamforming device, the characteristics of the non-beamforming device retrieved from the memory using the identifier received from the beamforming device, the feedback matrix received from the beamforming device based on the characteristics of the non-beamforming device.

4. The access point of claim 1, further comprising a memory storing the characteristics of the non-beamforming device in association with an identifier of the non-beamforming device, wherein the processor is further configured to:
receive, from the beamforming device, the identifier of the non-beamforming device in association with a respective signal strength of the non-beamforming device at the beamforming device, the non-beamforming device being in communication with the beamforming device at the given position;
when the signal strength is above a threshold signal strength, transmit, to the beamforming device, the characteristics of the non-beamforming device, the feedback matrix received from the beamforming device based on the characteristics of the non-beamforming device; and
when the signal strength is below the threshold signal strength, communicate with the non-beamforming device using the communication interface in a non-beamforming mode.

5. The access point of claim 1, wherein the processor is further configured to:
receive, from one or more location sensors, using the communication interface, data indicative of positions of each of the beamforming device and the non-beamforming device; and,
control the communication interface to beam form using the beamforming steering matrix to communicate with the non-beamforming device only when the beamforming device and the non-beamforming device are with a given threshold distance.

6. The access point of claim 1, further comprising a memory, wherein the processor is further configured to:
store the beamforming steering matrix in the memory in association with the given position;
receive, from one or more location sensors, using the communication interface, an indication that the non-beamforming device is located at the given position; and, in response,
control the communication interface to beam form using the beamforming steering matrix to communicate with the non-beamforming device located at the given position only when the non-beamforming device is at the given position.

7. A method comprising:
at an access point including a processor, and a communication interface configured for beamforming, determining, at the processor, a beamforming steering matrix from a feedback matrix received from a beamforming device located at a given position;
transmitting, to the beamforming device, characteristics of the non-beamforming device, the feedback matrix received from the beamforming device based on the characteristics of the non-beamforming device; and
controlling, at the processor, the communication interface to beam form using the beamforming steering matrix to communicate with a non-beamforming device located at the given position.

8. The method of claim 7, wherein the access point further comprises a memory storing the characteristics of the non-beamforming device in association with an identifier of the non-beamforming device, and the method further comprises:
receiving, from the beamforming device, the identifier of the non-beamforming device, the non-beamforming device being proximal to, and in communication with, the beamforming device at the given position; and,
transmitting, to the beamforming device, the characteristics of the non-beamforming device, the feedback matrix received from the beamforming device based on the characteristics of the non-beamforming device.

9. The method of claim 7, wherein the access point further comprises a memory, and the method further comprises:
determining an identifier and the characteristics of the non-beamforming device by initially communicating with the non-beamforming device using the communication interface in a non-beamforming mode;
storing the identifier and the characteristics of the non-beamforming device in the memory;
receiving, from the beamforming device, the identifier of the non-beamforming device; and,
transmitting, to the beamforming device, the characteristics of the non-beamforming device retrieved from the memory using the identifier received from the beamforming device, the feedback matrix received from the beamforming device based on the characteristics of the non-beamforming device.

10. The method of claim 7, wherein the access point further comprises a memory storing the characteristics of the non-beamforming device in association with an identifier of the non-beamforming device, and the method further comprises:
receiving, from the beamforming device, the identifier of the non-beamforming device in association with a respective signal strength of the non-beamforming device at the beamforming device, the non-beamforming device being in communication with the beamforming device at the given position;
when the signal strength is above a threshold signal strength, transmitting, to the beamforming device, the characteristics of the non-beamforming device, the feedback matrix received from the beamforming device based on the characteristics of the non-beamforming device; and when the signal strength is below the threshold signal strength, communicating with the non-beamforming device using the communication interface in a non-beamforming mode.

11. The method of claim 7, further comprising:
receiving, from one or more location sensors, using the communication interface, data indicative of positions of each of the beamforming device and the non-beamforming device; and,
controlling the communication interface to beam form using the beamforming steering matrix to communicate with the non-beamforming device only when the beamforming device and the non-beamforming device are with a given threshold distance.

12. The method of claim 7, wherein the access point further comprises a memory, and the method further comprises:
storing the beamforming steering matrix in the memory in association with the given position;
receiving, from one or more location sensors, using the communication interface, an indication that the non-beamforming device is located at the given position; and, in response,
controlling the communication interface to beam form using the beamforming steering matrix to communicate with the non-beamforming device located at the given position only when the non-beamforming device is at the given position.

13. A beamforming device comprising:
a processor, and a communication interface configured for beamforming, the processor configured to:
receive, using the communication interface, an identifier of a non-beamforming device in wireless communication therewith, and characteristics of the non-beamforming device;
determine, from the characteristics of the non-beamforming device, a feedback matrix of the non-beamforming device; and,
transmit the feedback matrix to an access point.

14. The beamforming device of claim 13, wherein the processor is further configured to receive the characteristics of the non-beamforming device by:
receiving, from the non-beamforming device, the identifier of the non-beamforming device;
transmitting, using the communication interface, the identifier to the access point; and,
receiving, from the access point, the characteristics of the non-beamforming device.

15. The beamforming device of claim 13, wherein the processor is further configured to:
determine a signal strength of the non-beamforming device at the beamforming device; and
transmit the identifier to the access point only when the signal strength is above a threshold signal strength.

16. The beamforming device of claim 13, wherein the processor is further configured to:
determine a signal strength of the non-beamforming device at the beamforming device; and
transmit, to the access point, the identifier and the signal strength in association with each other.

* * * * *